United States Patent [19]

Fujibayashi et al.

[11] Patent Number: 4,525,036
[45] Date of Patent: Jun. 25, 1985

[54] ZOOM LENS

[75] Inventors: Kazuo Fujibayashi; Muneharu Sugiura; Sadahiko Tsuji, all of Kanagawa, Japan

[73] Assignee: Tokyo Shibaura Denki Kabushiki Kaisha, Kawasaki, Japan

[21] Appl. No.: 470,623

[22] Filed: Feb. 28, 1983

[30] Foreign Application Priority Data

Mar. 8, 1982 [JP] Japan ................... 57-36922
Jul. 21, 1982 [JP] Japan ................... 57-127035
Jul. 23, 1982 [JP] Japan ................... 57-128563
Jul. 23, 1982 [JP] Japan ................... 57-128564
Oct. 14, 1982 [JP] Japan ................... 57-180677

[51] Int. Cl.³ ............................... G02B 15/00
[52] U.S. Cl. .................................. 350/427
[58] Field of Search ................ 350/427, 423

[56] References Cited

U.S. PATENT DOCUMENTS 3,961,845 6/1976 Doi et al. ................ 350/427
3,997,244 12/1976 Takano .................... 350/427
4,033,674 7/1977 Sekiguchi ................. 350/427

Primary Examiner—John K. Corbin
Assistant Examiner—Paul M. Dzierzynski
Attorney, Agent, or Firm—Finnegan, Henderson, Farabow, Garrett & Dunner

[57] ABSTRACT

A zoom lens having, from front to rear, a 1st lens group having a positive refractive power for focusing, a 2nd lens group of negative refractive power having a magnification changing function, a 3rd lens group having a negative refractive power for compensating for the image shift resulting from the change of the magnification, and a 4th lens group of positive refractive power having an image forming function, the aforesaid 4th lens group having two lens groups with the front or 4-1st lens group and the rear or 4-2nd lens group. The form and construction and arrangement of the lens elements of the aforesaid 4-1st and the aforesaid 4-2nd lens groups are properly set forth so as to achieve good correction of aberrations and, at the same time, limiting the bulk and size of the entire system to a minimum.

7 Claims, 130 Drawing Figures

F I G. 12
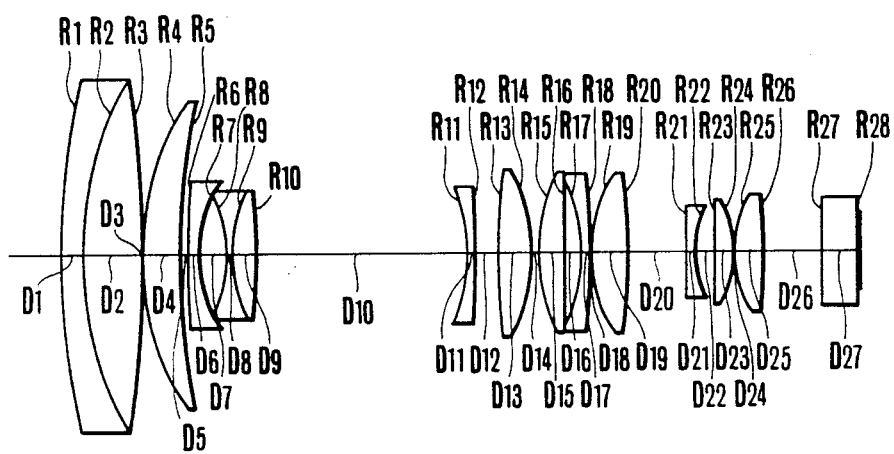
F I G. 13
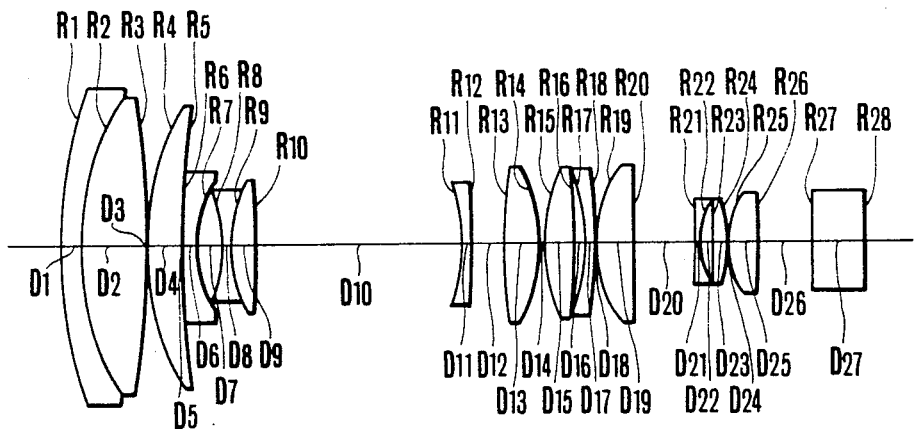

SPHERICAL ABERRATION

ASTIGMATISM

DISTORTION(%)

SPHERICAL ABERRATION

ASTIGMATISM

DISTORTION(%)

SPHERICAL ABERRATION

ASTIGMATISM

DISTORTION(%)

FIG.16-1 FIG.16-2 FIG.16-3
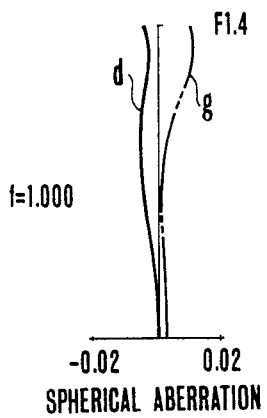
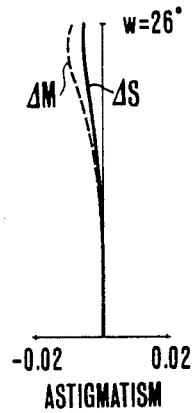
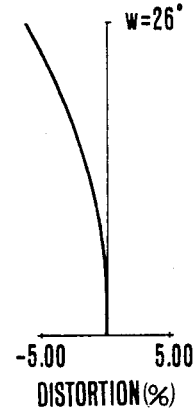
FIG.16-4 FIG.16-5 FIG.16-6
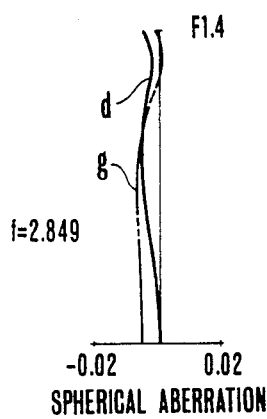
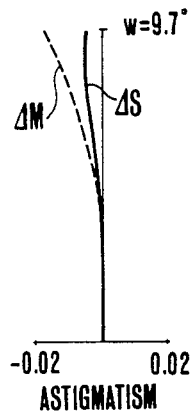
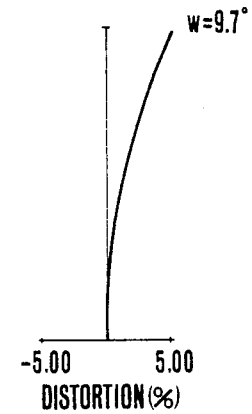
FIG.16-7 FIG.16-8 FIG.16-9
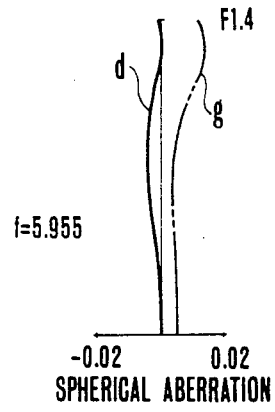
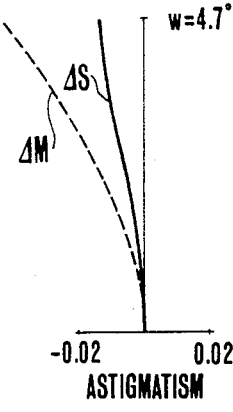
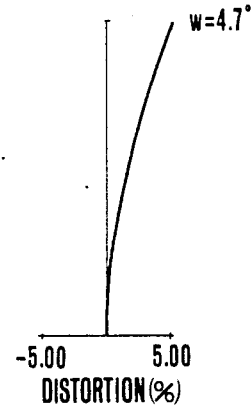

f=1.000
SPHERICAL ABERRATION

ASTIGMATISM

DISTORTION(%)

f=2.849
SPHERICAL ABERRATION

ASTIGMATISM

DISTORTION(%)

f=5.952
SPHERICAL ABERRATION

ASTIGMATISM

DISTORTION(%)

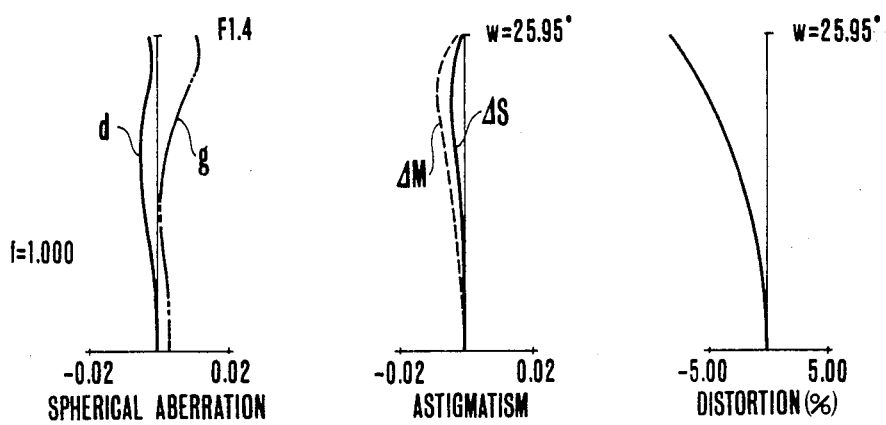
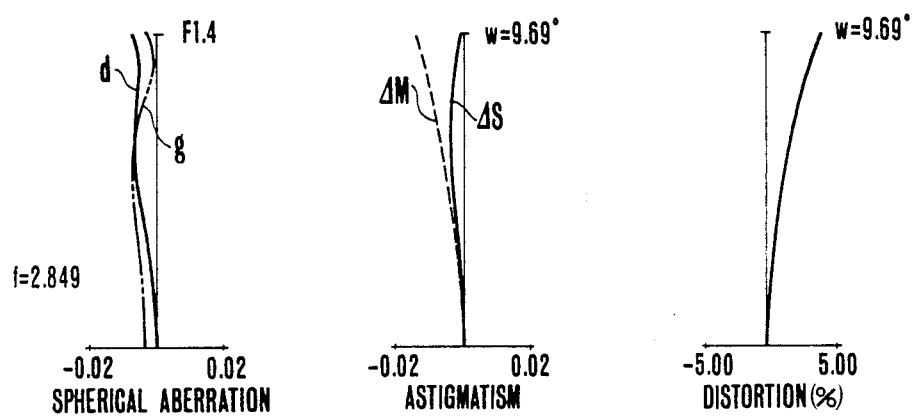
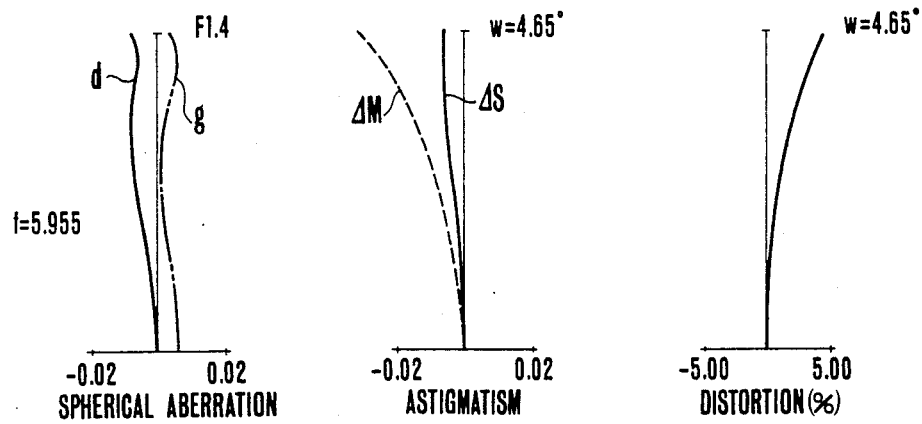

4,525,036

1

ZOOM LENS

BACKGROUND OF THE INVENTION

1. Field of the Invention

This invention relates to zoom lenses, and, more particularly, to zoom lenses of compact form while still having a large relative aperture, and which are suited for use in video cameras.

2. Description of the Prior Art

Since, in general, the image pickup elements of the video cameras have low sensitivities, it is desired that objective lenses for use therein are fast lenses. It is also desired that the physical length of the objective lens is reduced to provide a small-sized and light-weight video camera.

Further, of the single-tube color video cameras, there are the phase separation type and the three-electrode type which require that the objective lens be constructed in the form of a telecentric optical system so as to prevent color discrepancy.

Now, for use as the pickup tube for video cameras, from two points of view, namely, compactness and image quality, ⅔ inch tubes have generally found great use.

While the use of the ⅔ inch tube admits of making the speed of the lens as slow as f/¼, the ½ inch tube, because its image receiving surface is half that of the ⅔ inch tube, has a need that the speed of the lens be increased to about f/1.0. In order to realize a high relative aperture zoom lens having f/1.0 or thereabout, the form and construction and arrangement of the elements of the so-called image forming lens become very important as it is used in performing good correction of the residual aberrations of the variator. With conventional ones, however, as the relative aperture increases, it becomes difficult to correct the spherical aberration in the paraxial zone of the picture frame, the coma up to the marginal zone, and sagittal halo, thus resulting in a loss of contrast. Particularly when aiming at achieving greater compactness, this tendency became prominent.

Since the objective lens adapted to be used in the video camera has to fulfill many requirements, as will be seen from the above, it is in the zoom type of objective lens that the achievement of all the above-described features makes it difficult to solve the aberrational problem. In particular, the spherical aberration in the shorter focal length position, and the coma and field curvature in zones up to the margin are difficult to correct. As a result, the contrast is caused to be low.

Prior art related to the zoom lens according to the present invention, include U.S. Pat. Nos. 4,025,167, 4,200,358 and 4,230,398 and Japanese Laid-Open Patents Nos. Sho 57-135912 and 52-31743.

SUMMARY OF THE INVENTION

An object of the present invention is to provide a zoom lens having an F-number of about 1.4 for a ⅔ inch pickup tube, and an F-number of about 1.0 for a ½ inch pickup tube, with a total length equal to less than 1.9 times the longest focal length of the entire system and the lens configuration in a telecentric optical system, while still permitting good stability of aberration correction.

To achieve this, one of the features of the present invention is that the zoom lens comprises, from front to rear, a 1st lens group of positive power for focusing, a 2nd lens group of negative power having an image magnification changing function, a 3rd lens group of negative power for compensating for the image shift resulting from the change in the image magnification, and a 4th lens group of positive power having an image forming function, whereby the aforesaid 4th lens group is constructed as comprising, from front to rear, a 4-1st lens group and a 4-2nd lens group, and the form and construction and arrangement of the elements of the aforesaid 4-1st and 4-2nd lens groups are properly set forth.

BRIEF DESCRIPTION OF THE DRAWINGS

FIGS. 1 through 13 are lens block diagrams of numerical embodiments 1 through 13 of the invention.

FIGS. 14-1 through 26-9 are graphic representations of the aberrations of the lenses of FIGS. 1 through 13 respectively.

DETAILED DESCRIPTION OF THE PREFERRED EMBODIMENTS

Figure 1:
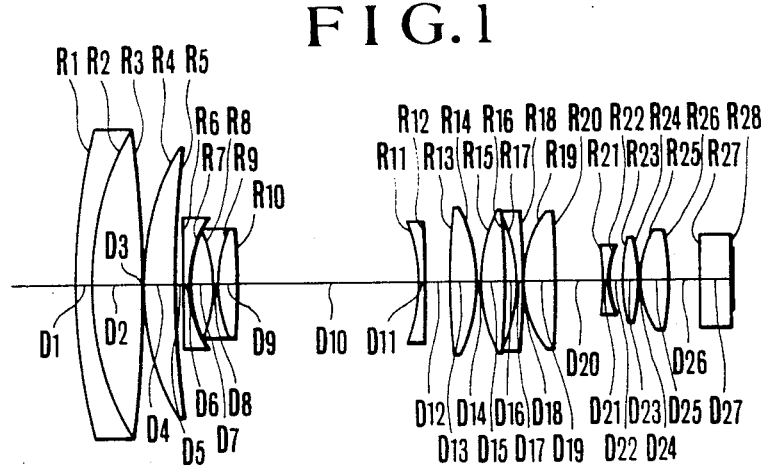
Figure 2:
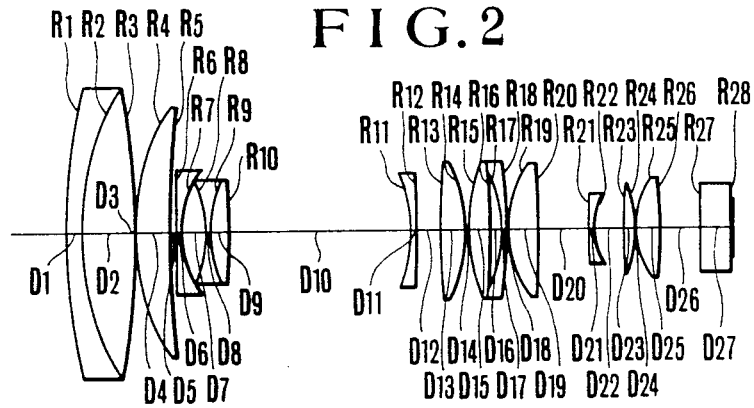
Figure 3:
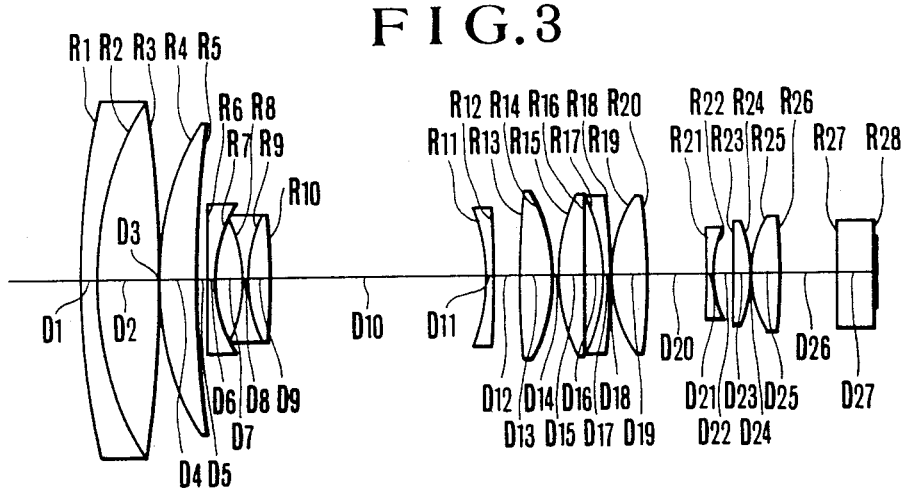
Figure 4:
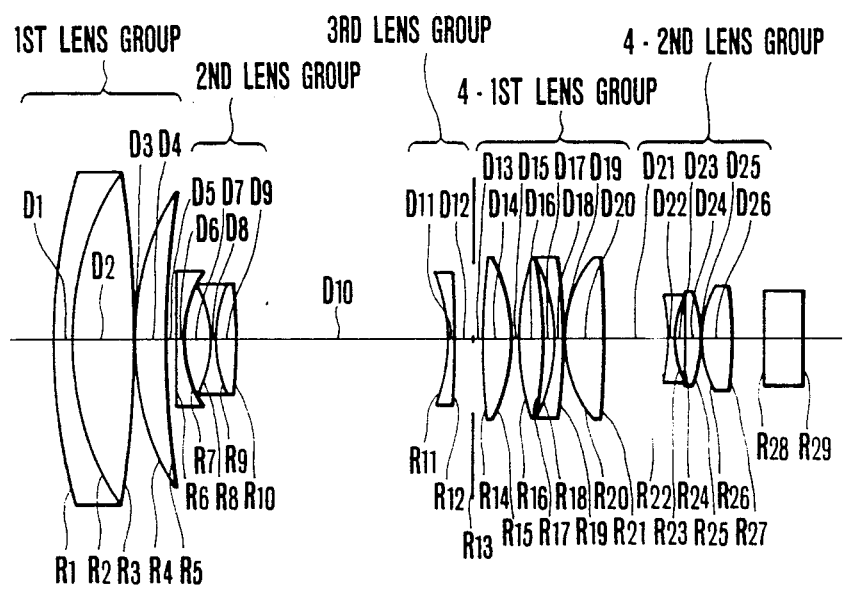
Figure 5:
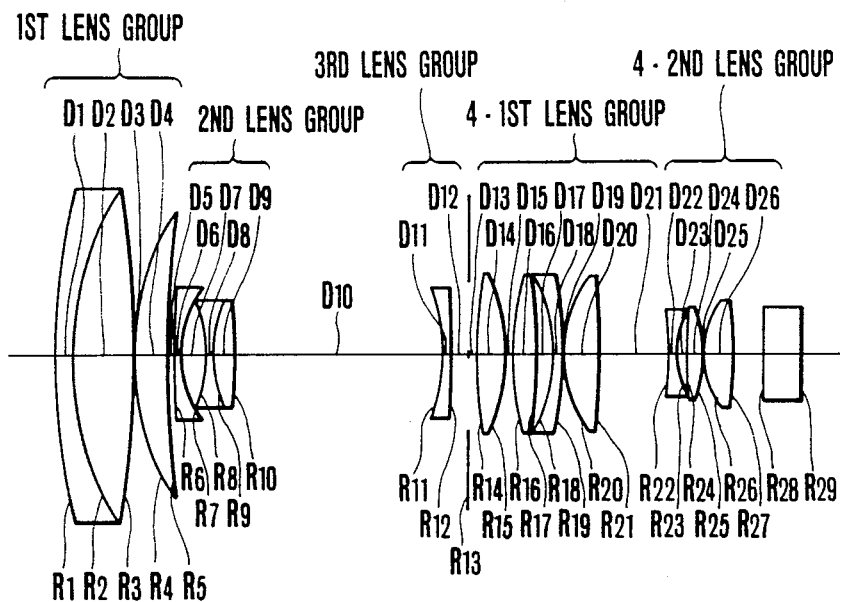
Figure 6:
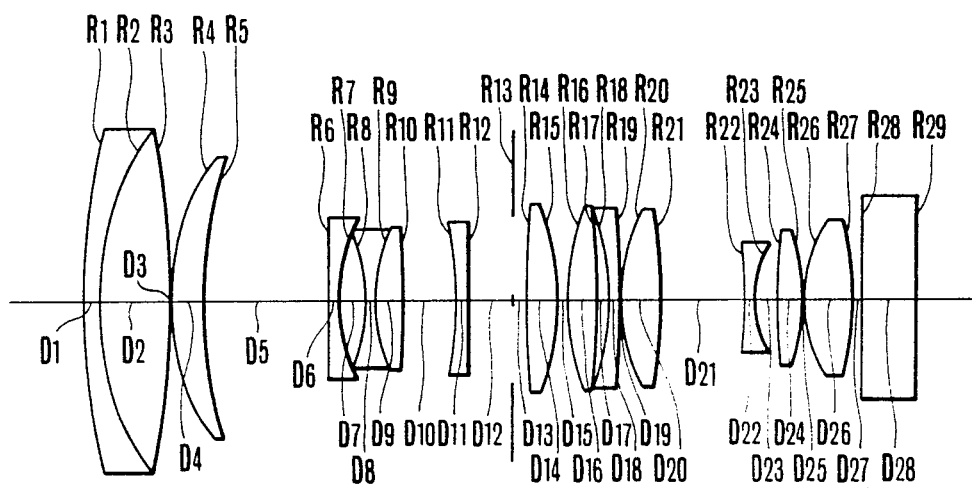
Figure 7:
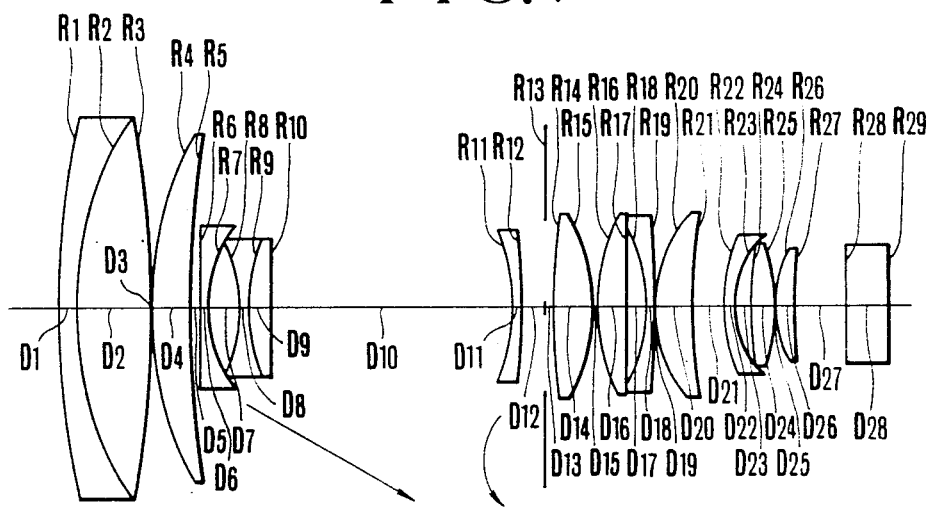
Figure 8:
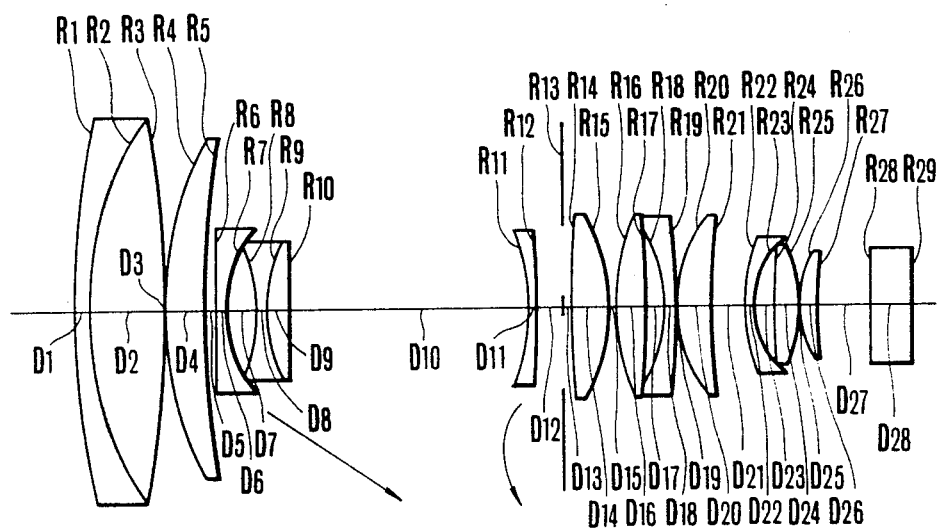
Figure 9:
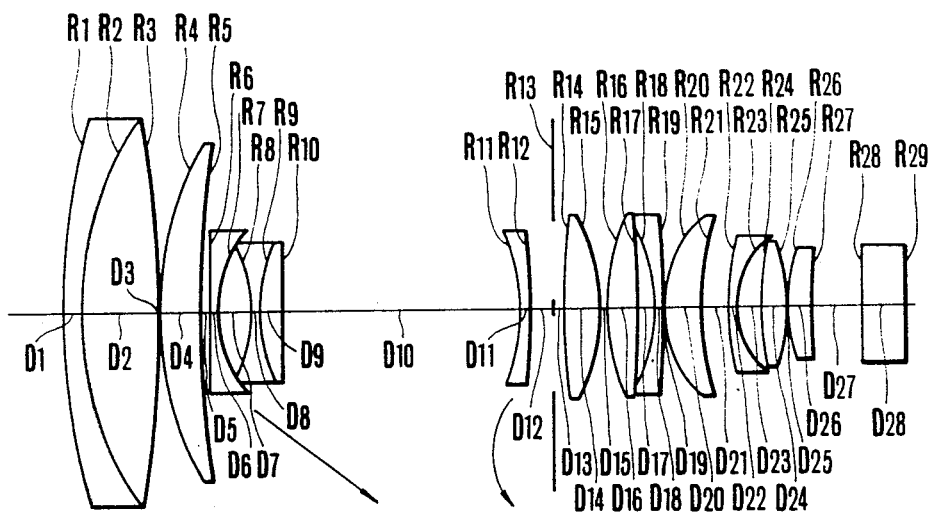
Figure 10:
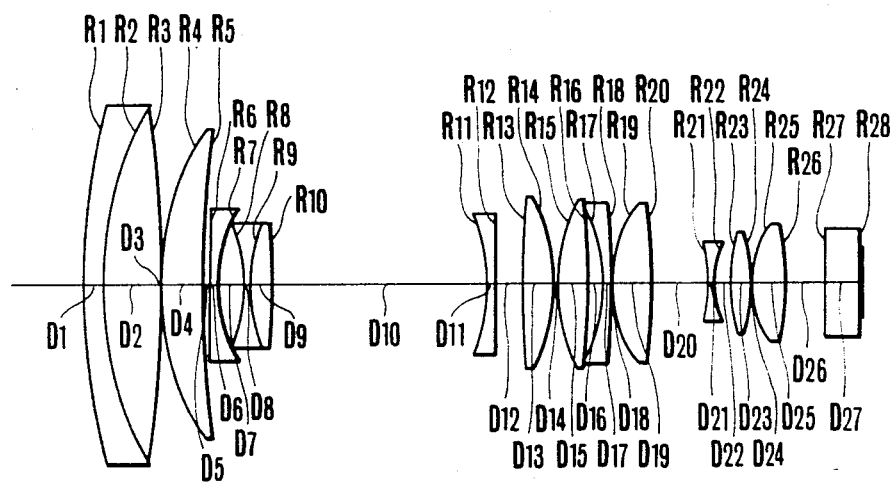
Figure 11:
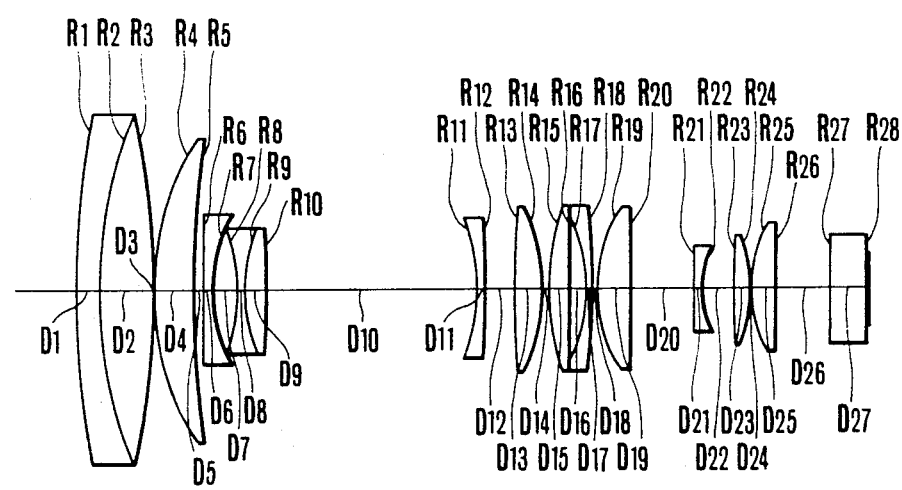
Figures 1, 14:
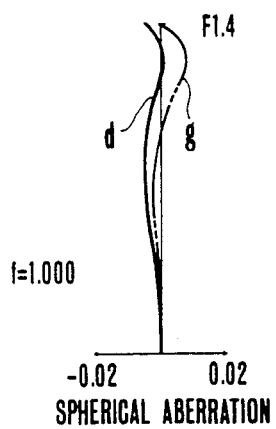
Figures 2, 14:
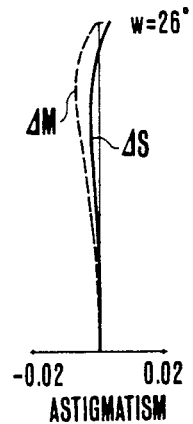
Figures 3, 14:
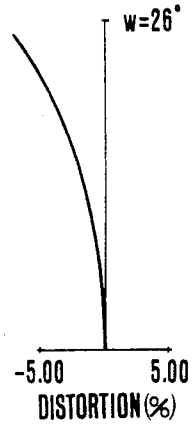
Figures 4, 14:
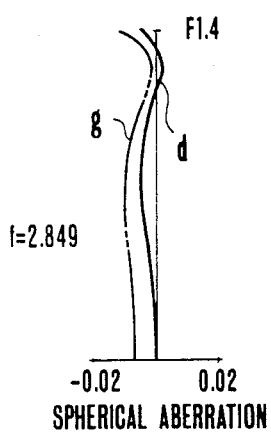
Figures 5, 14:
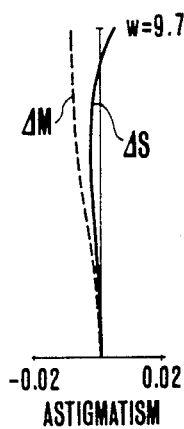
Figures 6, 14:
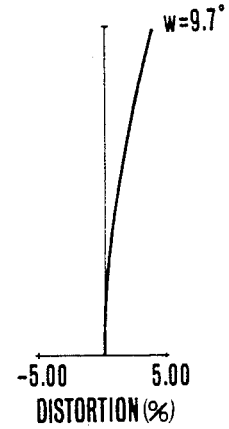
Figures 7, 14:
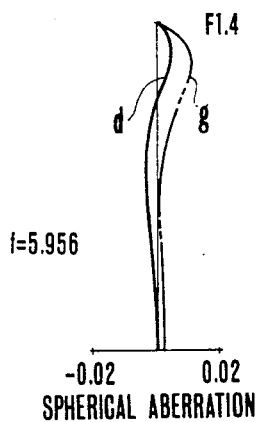
Figures 8, 14:
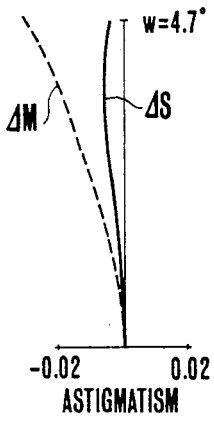
Figures 9, 14:
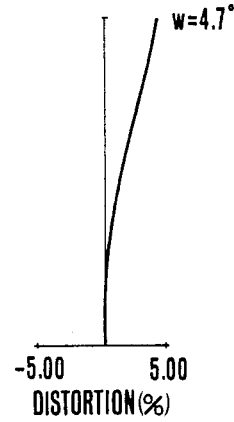
Figures 1, 15:
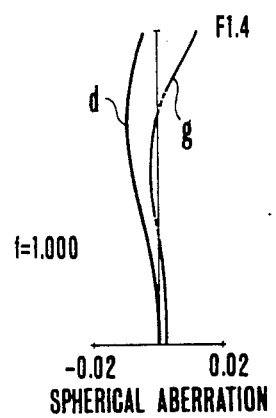
Figures 2, 15:
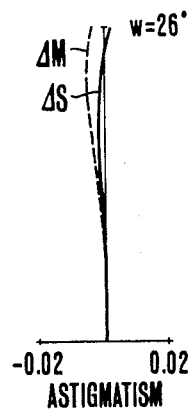
Figures 3, 15:
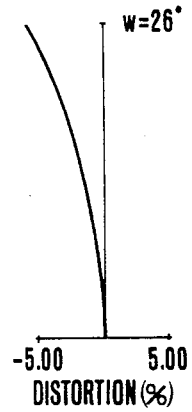
Figures 4, 15:
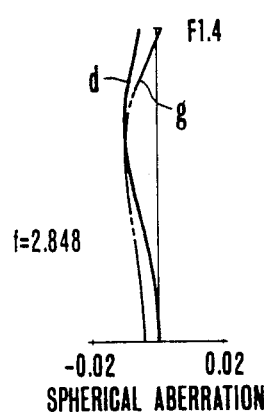
Figures 5, 15:
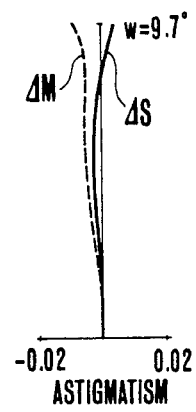
Figures 6, 15:
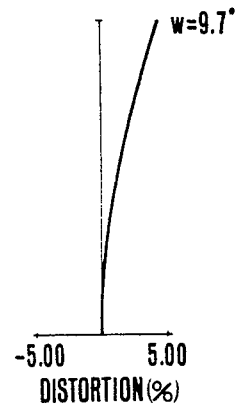
Figures 7, 15:
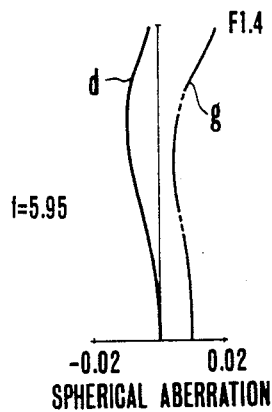
Figures 8, 15:
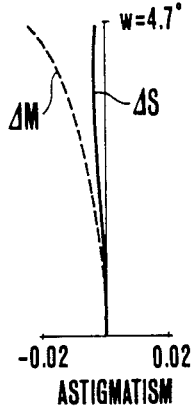
Figures 9, 15:
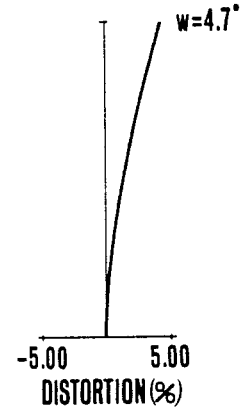
Figures 1, 17:
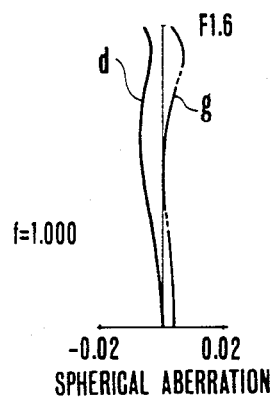
Figures 2, 17:
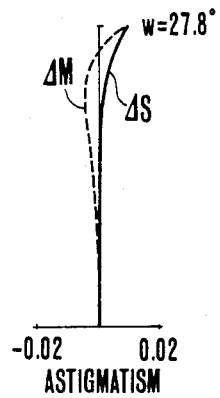
Figures 3, 17:
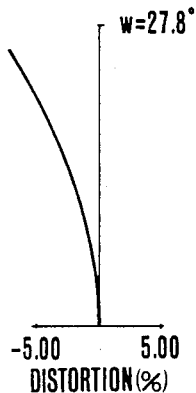
Figures 4, 17:
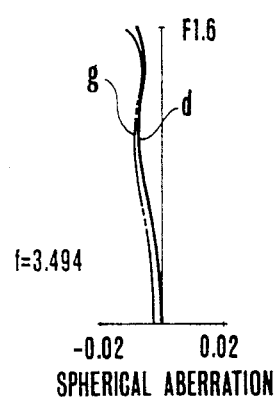
Figures 5, 17:
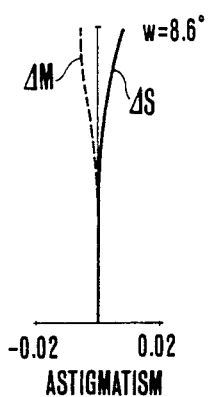
Figures 6, 17:
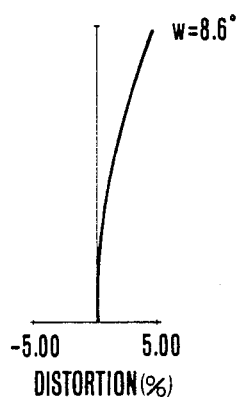
Figures 7, 17:
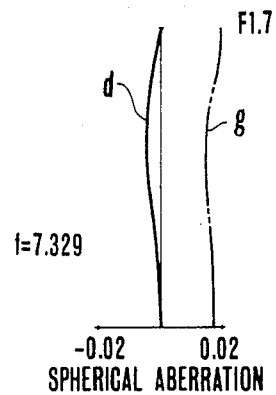
Figures 8, 17:
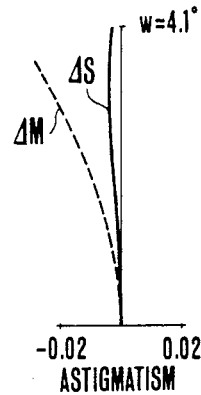
Figures 9, 17:
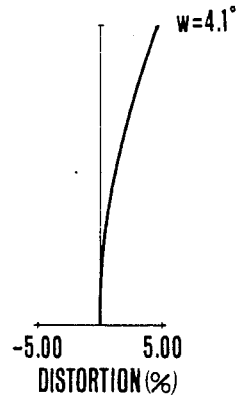
Figures 1, 2, 3, 18:
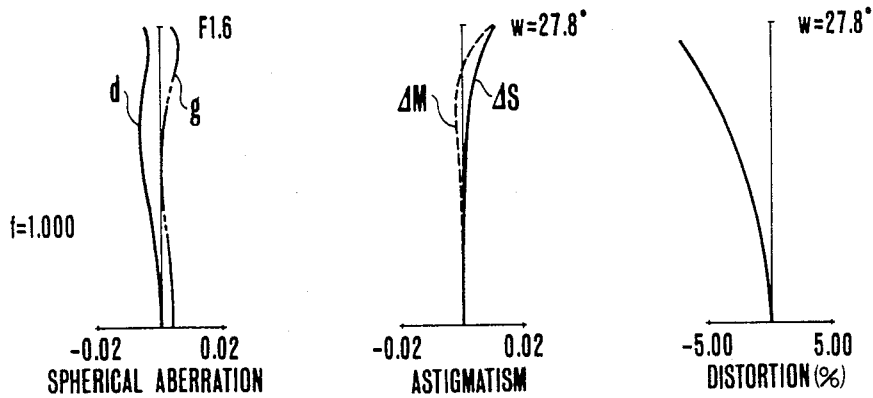
Figures 4, 5, 6, 18:
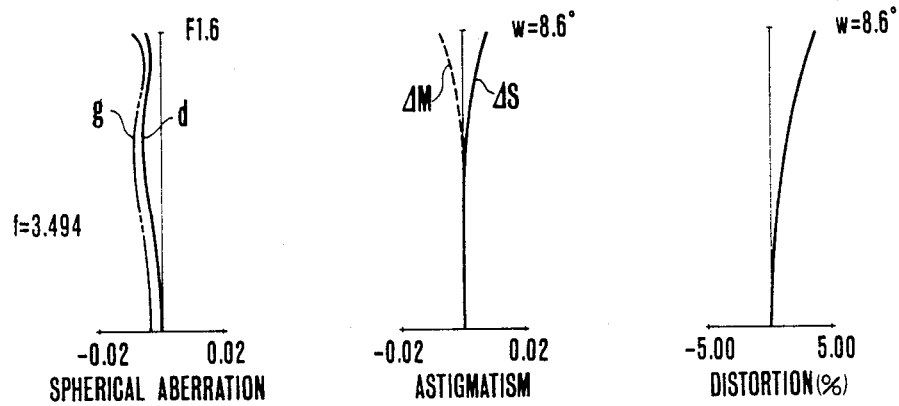
Figures 7, 8, 9, 18:
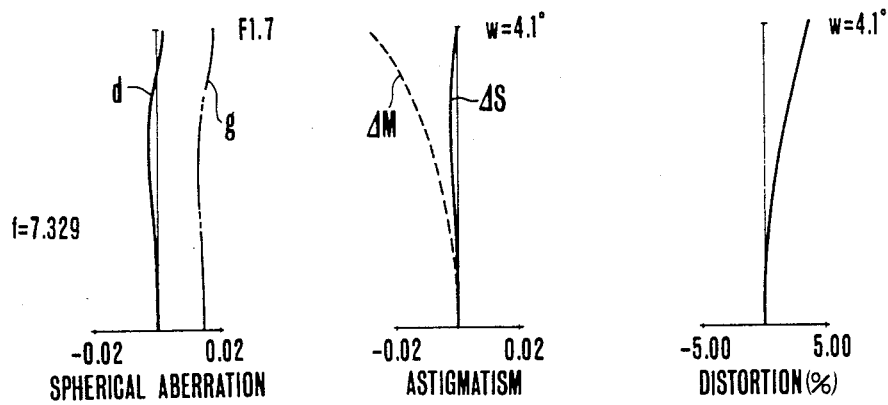
Figures 1, 19:
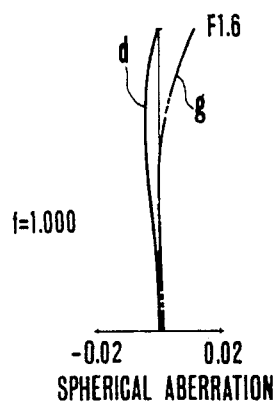
Figures 2, 19:
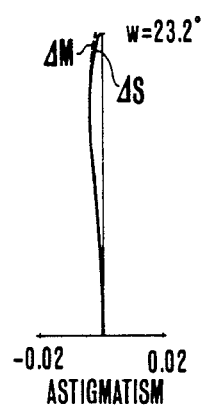
Figures 3, 19:
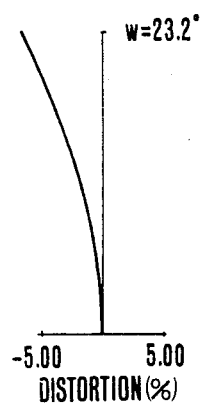
Figures 4, 19:
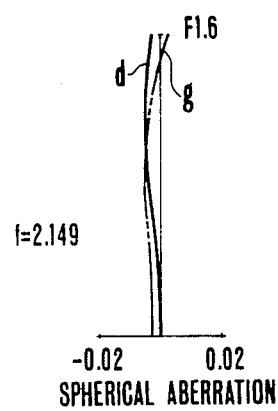
Figures 5, 19:
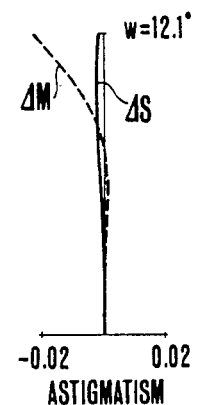
Figures 6, 19:
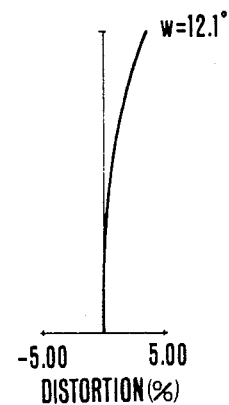
Figures 7, 19:
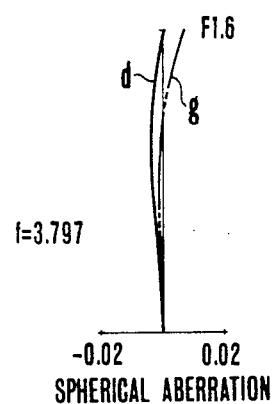
Figures 8, 19:
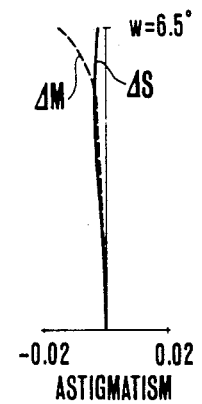
Figures 9, 19:
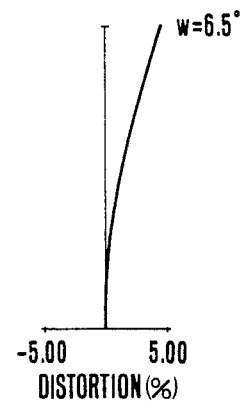
Figures 1, 2, 3, 20:
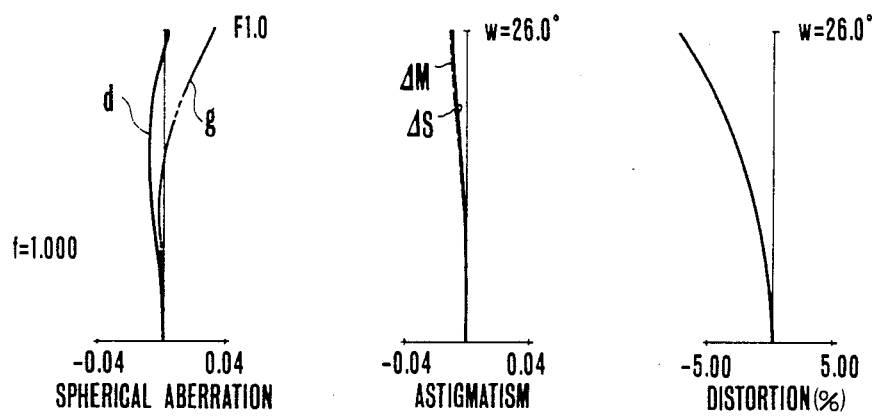
Figures 4, 5, 6, 20:
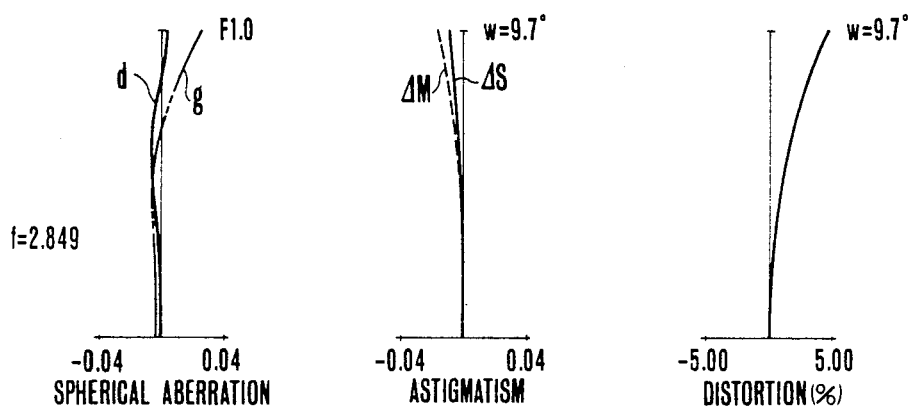
Figures 7, 8, 9, 20:
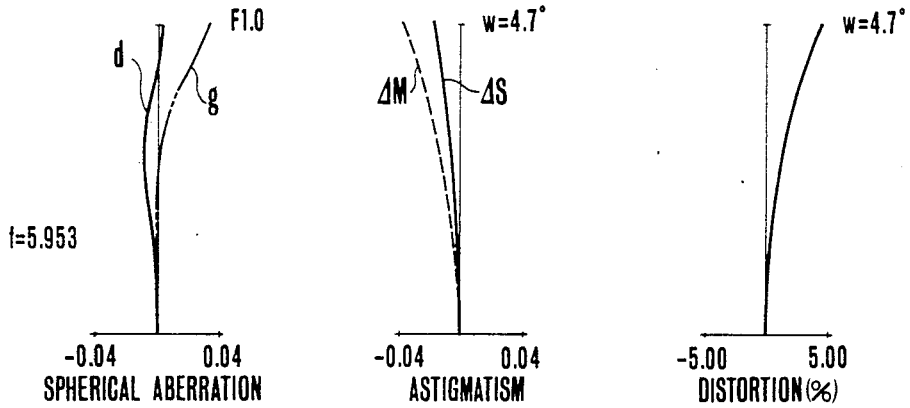
Figures 1, 21:
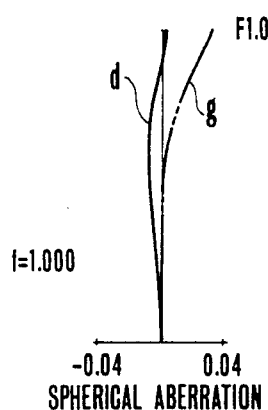
Figures 2, 21:
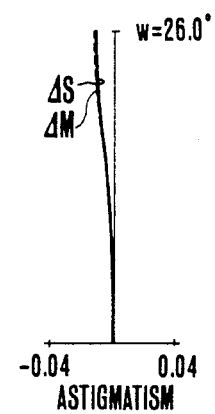
Figures 3, 21:
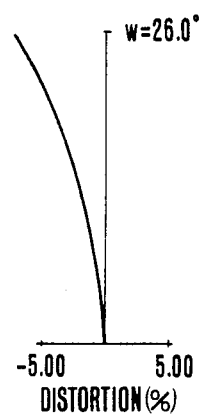
Figures 4, 21:
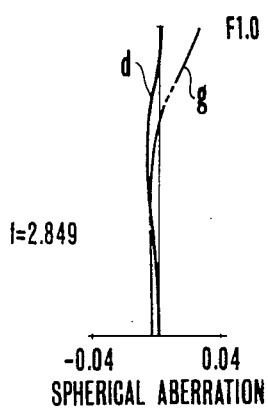
Figures 5, 21:
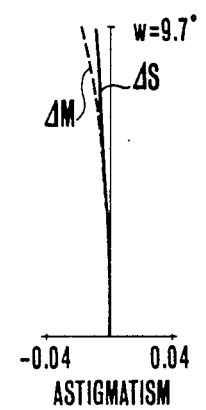
Figures 6, 21:
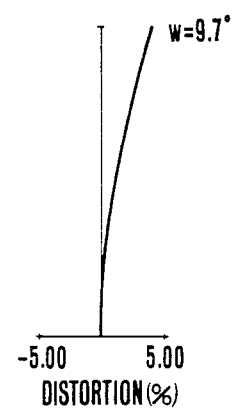
Figures 7, 21:
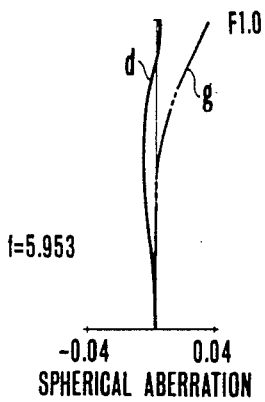
Figures 8, 21:
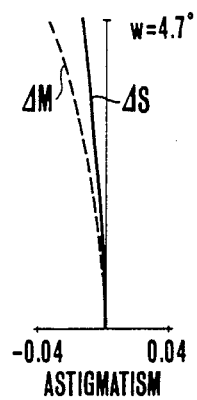
Figures 9, 21:
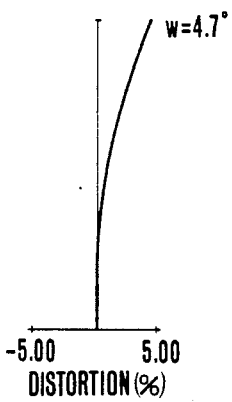
Figures 1, 22:
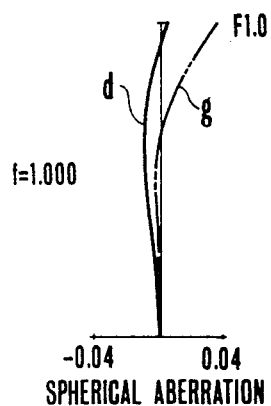
Figures 2, 22:
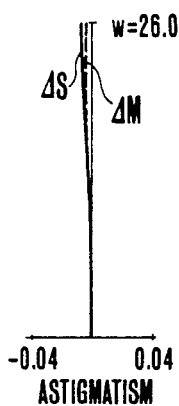
Figures 3, 22:
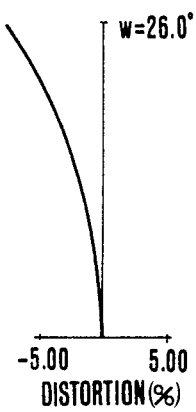
Figures 4, 22:
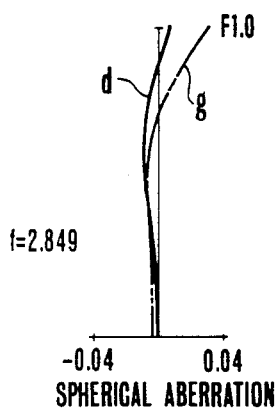
Figures 5, 22:
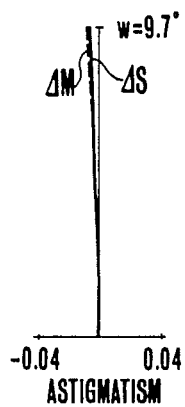
Figures 6, 22:
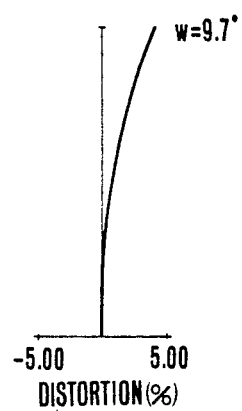
Figures 7, 22:
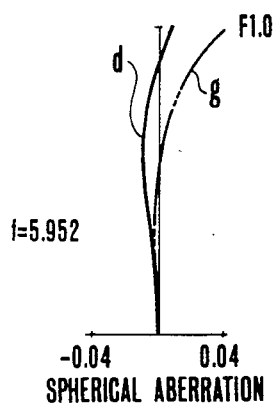
Figures 8, 22:
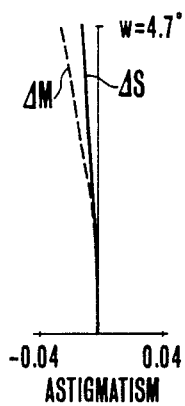
Figures 9, 22:
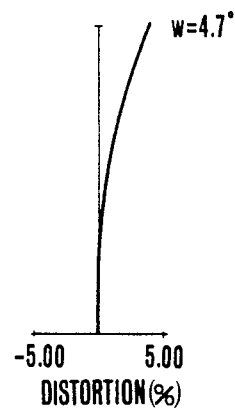
Figures 1, 2, 3, 23:
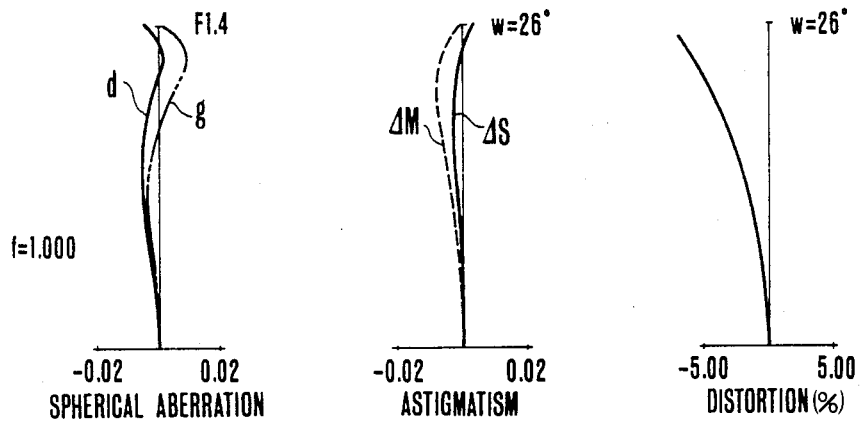
Figures 4, 5, 6, 23:
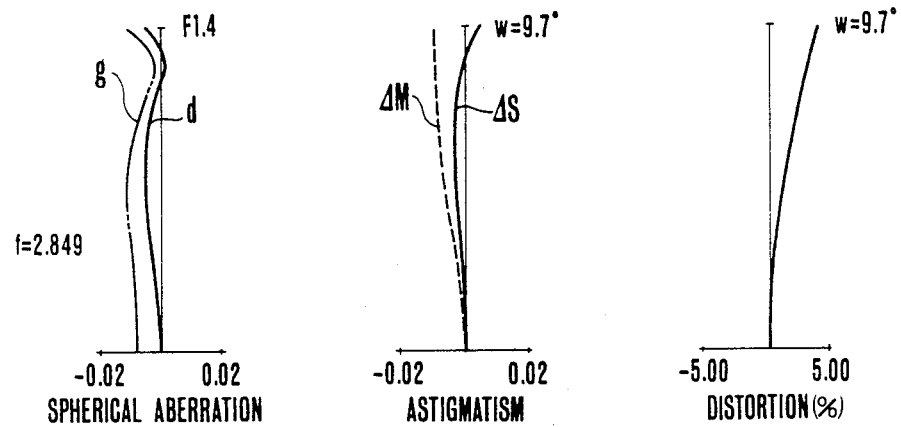
Figures 7, 8, 9, 23:
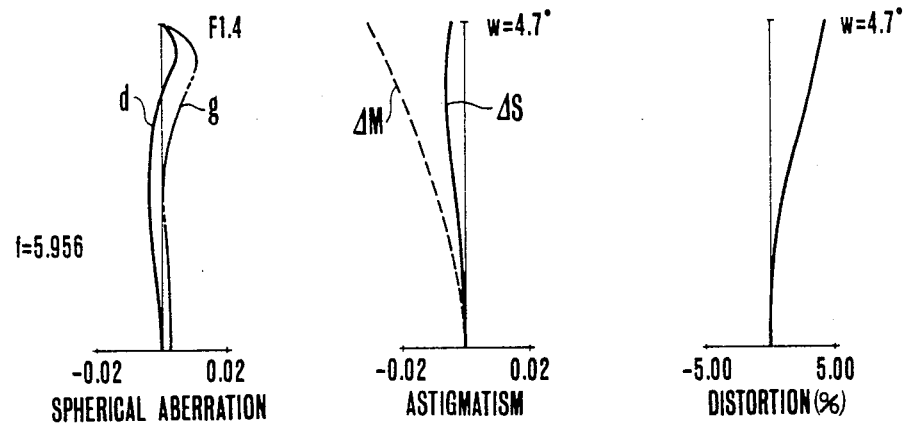
Figures 1, 2, 3, 24:
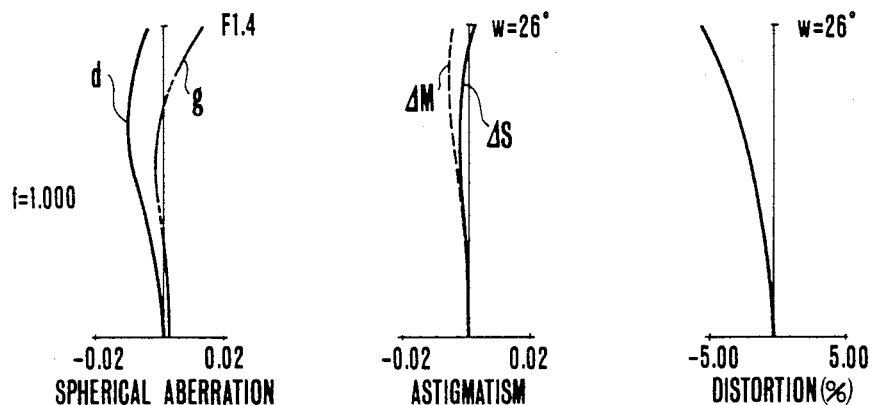
Figures 4, 5, 6, 24:
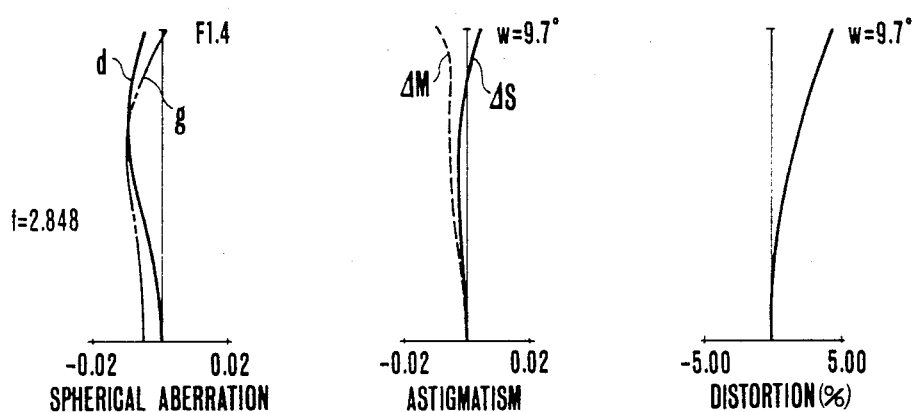
Figures 7, 8, 9, 24:
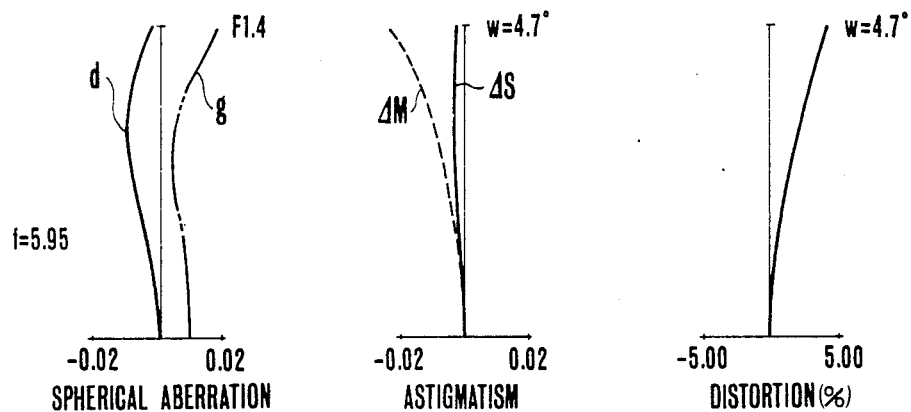
Figures 1, 2, 3, 25:
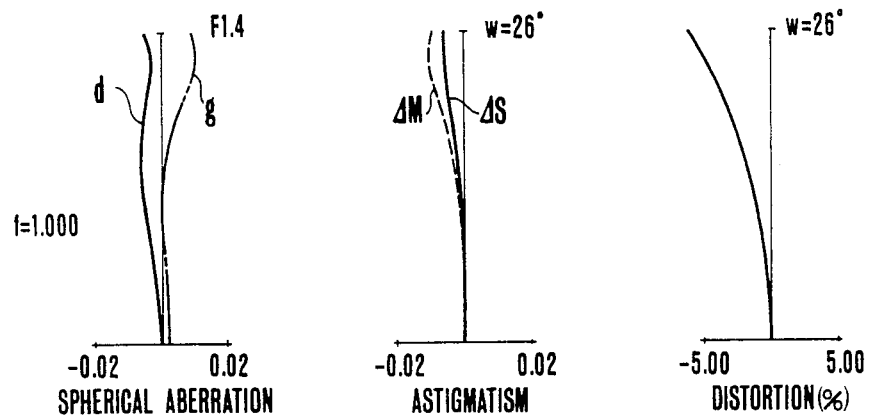
Figures 4, 5, 6, 25:
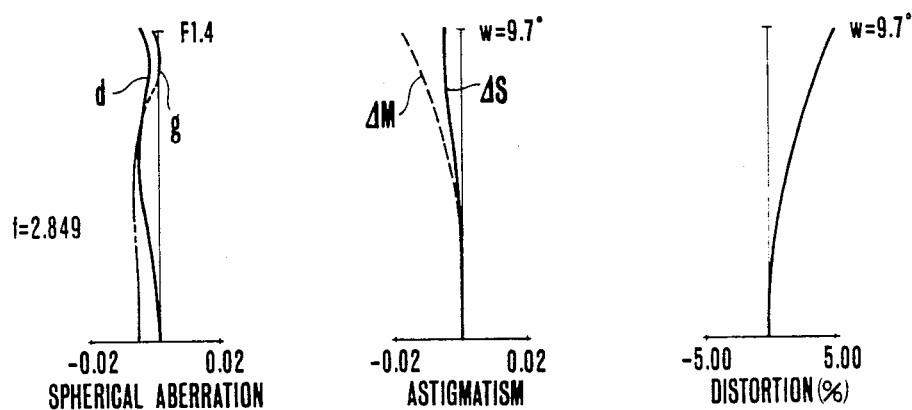
Figures 7, 8, 9, 25:
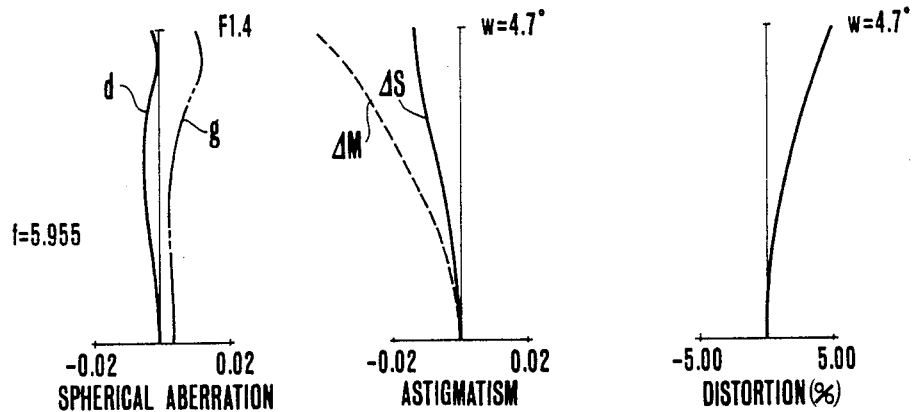

The zoom lens of the present invention has, from front to rear, a 1st lens group having a positive refractive power for focusing, a 2nd lens group of negative refractive power having an image magnification changing function, a 3rd lens group having a negative refractive power for compensating for the image shift resulting from the change in the image magnification, and a 4th lens group of positive refractive power having an image forming function. In particular, a feature of the present invention resides in that the aforesaid 4th lens group has two lens groups, or, from front to rear, a 4-1st lens group and a 4-2nd lens group, and the aforesaid 4-1st lens group has, from front to rear, a bi-convex 1st lens $4_{11}$ with its rear surface having a strong refractive power, a bi-convex 2nd lens $4_{12}$ with its front surface having a strong refractive power, a 3rd lens of negative refractive power turning its concave surface toward the front, and a 4th lens $4_{14}$ of positive refractive power turning its convex surface toward the front.

The aforesaid 4-2nd lens group has, from front to rear, a 1st lens $4_{21}$ of negative refractive power turning its concave surface toward the rear, a bi-convex 2nd lens $4_{22}$ having a strong refractive power in the rear surface thereof, and a 3rd lens of positive refractive power having a strong refractive power in the front surface and turning its convex surface toward the front.

Though the zoom lens of the invention has been described in connection with the 1st lens group as made movable for focusing, either the 4-1st lens group or the 4-2nd lens group may be instead used alone to effect focusing, or the 4th lens group may be moved as a whole to effect focusing.

It is known in the prior art of zoom lenses of the type described above to otherwise construct the 4-1st lens group from lens elements of positive, positive, positive and negative refractive powers in this order from the front. Such construction and arrangement of the lens elements could achieve reduction of the bulk and size of the zoom lens to some extent, but had a tendency to over-correct spherical aberration particularly regarding the spherical aberration in the shorter wave length positions, and further to produce inward coma in zones up to the margin of the picture frame. As these residual aberrations were difficult to compensate for, the contrast of the image was caused to lower.

In the zoom lens of the invention, therefore, the 4-1st lens group is made constructed with the lens elements $4_{11}$, $4_{12}$, $4_{13}$ and $4_{14}$ having, from front to rear, positive, positive, negative and positive refractive powers, thereby making it possible to achieve good stability of correction of aberrations and particularly spherical aberration throughout the entire wave range, and further good correction of inward coma also, thus eliminating the above-described drawbacks of the conventional zoom lens.

Another feature of the invention is that the 4-2nd lens group is constructed with the lens elements $4_{21}$, $4_{22}$ and $4_{23}$ of negative, positive and positive powers in this order from the front, and these lens elements are configured to proper shapes, and further a telecentric optical system is employed so that even when applied to the phase separation type and the three-electrode type of single-tube color video cameras, the color discrepancy is prevented, and a minimization of the bulk and size of the complete zoom lens is facilitated.

The form and construction and arrangement of the lens elements constituting the 4-1st and 4-2nd lens groups are further described in more detail below.

The 4-1-1st lens has a duty of converging the diverging light bundles from the 3rd lens group to almost afocal light bundles and is configured to such shape that the rear surface is strongly curved toward the rear so as not to produce spherical aberration and coma as well as possible. The 4-1-2nd lens and 4-1-3rd lens have a duty of correcting spherical aberration and longitudinal chromatic aberration, and are positioned adjacent to each other to form an air lens therebetween by which the spherical aberration in the shorter wave length positions and the coma in the marginal zone are effectively corrected.

The 4-1-4th lens having a duty of converging light bundles turns its strong refractive surface toward the front so as to produce as little spherical aberration as possible. In order to form a telecentric optical system effectively, the 4-2-1st lens is made to be a lens of strong negative refractive power, and the 4-2-2nd lens and 4-2-3rd lens are made to be lenses of strong positive refractive power.

Also, the 4-2-1st lens is figured with its rear surface at a strong refraction so as to reduce coma and particularly outward coma to as small a value as possible. As the 4-2-1st lens of such form nevertheless leaves some slight coma, this residual coma and the halo of sagittal rays of light are well corrected by configuring the 4-2-2nd and 4-2-3rd lenses in such a way that their strong refractive surfaces confront to each other.

In specific embodiments 1, 2 and 3 of the present invention, the 4-1st lens group has four lens elements, or, from front to rear, a bi-convex 4-1-1st lens having a strong refractive surface at the rear, a bi-convex 4-1-2nd lens having a strong refractive surface at the front, a 4-1-3rd lens of negative power having a strong refractive surface at the front, and a 4-1-4th lens of positive refractive power having a strong refractive surface at the front, and the aforesaid 4-2nd lens group has three lens elements, or, from front to rear, a 4-2-1st lens of negative power having a strong refractive surface at the rear, a bi-convex 4-2-2nd lens having a strong refractive surface at the rear, and a bi-convex 4-2-3rd lens having a strong refractive surface at the front.

Though the zoom lenses of the specific embodiments 1, 2 and 3 can attain the desired end when the above features are satisfied. To achieve a further improvement of the aberration correction, it is preferred to satisfy the following conditions:

That is, letting $R_{IVi}$ the radius of curvature of the i-th lens surface counting from front in the 4th lens group, $D_{IVi}$ the i-th axial lens thickness or air separation, and $f_W$ the shortest focal length of the entire system of the aforesaid zoom lens, $$0.9 < |R_{IV3}/R_{IV5}| < 1.35 \qquad (1)$$

(where $R_{IV3} > 0$, $R_{IV5} < 0$)

$$1.4 < R_{IV7}/f_W < 1.9 \qquad (2)$$

$$0.9 < R_{IV10}/f_W < 1.3 \qquad (3)$$

$$1.1 < |R_{IV12}/R_{IV13}| < 2 \qquad (4)$$

(where $R_{IV12} < 0$, $R_{IV13} > 0$)

$$1.15 < R_{IV13}/f_W < 1.45 \qquad (5)$$

$$0.14 < D_{IV4}/f_W < 0.27 \qquad (6)$$

$$0.8 < D_{IV8}/f_W < 0.9 \qquad (7)$$

$$0.23 < D_{IV10}/f_W < 0.5 \qquad (8)$$

are set forth.

Each of the above-described conditions is explained below.

Condition (1) is for adequately correcting spherical aberration. When the upper limit is exceeded, over-correction of spherical aberration results. When the lower limit is exceeded, it becomes under-corrected. Condition (2) is for converging light bundles with good effectiveness without causing the production of spherical aberration as best one can. When the upper limit is exceeded, the converging effect becomes insufficient, causing the total length of the lens to be increased. When the lower limit is exceeded, the spherical aberration is objectionably increased. Condition (3) is a condition that with the production of as little coma as possible, a compact and telecentric optical system is formed well. When the upper limit is exceeded, the telecentric optical system comes into existence with sacrificing the shortening of the total length of the lens system. When the lower limit is exceeded, extremely large outward coma is produced, which is difficult to compensate for by any design of the other lenses. Conditions (4) and (5) are for well compensating for the outward coma produced from the 4-2-1st lens and the halo of the sagittal rays of light. When these conditions are violated, it results either that the outward coma and the halo of sagittal rays become no longer sufficiently corrected, or conversely that inward coma and over-corrected type spherical aberration are produced, thus causing a remarkable loss in the optical performance.

When the upper limit of condition (4) and the lower limit of condition (5) are exceeded, inward coma and over-corrected type spherical aberration are largely produced. When the lower limit of condition (4) and the upper limit of condition (5) are exceeded, the residual outward coma of the 4-2-1st lens and the halo of sagittal rays cannot be fully compensated for. Condition (6) is for effectively correcting spherical aberration and longitudinal chromatic aberration. When the upper limit is exceeded, spherical aberration and longitudinal chromatic aberration are largely produced. When the lower limit is exceeded, large astigmatism is produced.

Condition (7) is to maintain a proper separation between the 4-1st lens group and the 4-2nd lens group for correcting the on-axis aberrations and the off-axis aberrations in good balance. When the upper limit is exceeded, spherical aberration and other on-axis aberration are difficult to correct. When the lower limit is exceeded, astigmatism, coma and other off-axis aberrations become difficult to correct. Condition (8) is for constructing a telecentric optical system in a good form while suppressing the production of aberrations. When the upper limit is exceeded, coma and distortion are extremely produced. When the lower limit is exceeded, the telecentric optical system becomes difficult to form.

In specific embodiments 4 and 5 of the invention, the 4-2-1st lens of the 4-2nd lens group is also formed to a bi-concave shape having a strong refractive power at the rear, while the others being similar to those in the specific embodiments 1 to 3. It is, however, in the 2nd lens group that the specific embodiments 4 and 5 differ, as having, from front to rear, a negative meniscus-shaped 2-1st lens having a strong refractive power at the rear, and a negative meniscus-shaped 2-2nd lens having a strong refractive power at the front with a cemented surface convex toward the front, and letting $R_{IIi}$ denote the radius of curvature of the i-th surface counting from front and $D_{IIi}$ the i-th lens thickness or air separation in the aforesaid 2nd lens group, $f_{II}$ the focal length of the 2nd lens group, and $f_T$ the longest focal length of the entire system, the following conditions are satisfied to thereby achieve a better correction of aberrations:

$$5.7 < |f_T/f_{II}| < 6.1 \quad (9)$$

$$0.18 < R_{II2}/f_T < 0.22 \quad (10)$$

$$1.75 < |R_{IV3}/R_{IV5}| < 1.95 \quad (11)$$

(where $R_{IV3} > 0$, $R_{IV5} < 0$)

$$1.7 < R_{II7}/f_W < 1.9 \quad (12)$$

$$1.15 < R_{II10}/f_W < 1.3 \quad (13)$$

$$0.15 < D_{II4}/f_W < 0.25 \quad (14)$$

$$0.95 < D_{II8}/f_W < 1.15 \quad (15)$$

$$0.12 < D_{II10}/f_W < 0.15 \quad (16)$$

Each of the above-stated conditions is explained below.

Condition (9) is for shortening the total length of the zoom lens. When the upper limit is exceeded, the total zooming movement of the 2nd lens group becomes large so that it becomes difficult to shorten the lens total length. When the lower limit is exceeded, as the refractive power of the 2nd lens group becomes large, spherical aberration and astigmatism are difficult to correct.

Condition (10) is a condition that while variation of aberrations being suppressed, the diameter of the front members is minimized. When the upper limit is exceeded, the diameter of the front members becomes large. When the lower limit is exceeded, the range of variation of distortion becomes large.

Condition (11) is for adequately correcting spherical aberration. When the upper limit is exceeded, spherical aberration is over-corrected. When the lower limit is exceeded, it becomes under-corrected.

Condition (12) is for converging light bundles with good effectiveness but without causing production of unduly large spherical aberration. When the upper limit is exceeded, the converging effect becomes insufficient, causing the lens total length to be increased. When the lower limit is exceeded, spherical aberration is extremely produced.

Condition (13) is a condition that without causing production of as unduly large coma as possible, a compact telecentric optical system is constructed in good form. When the upper limit is exceeded, the construction of the optical system in the telecentric form results in an increase of the total length of the lens system. When the lower limit is exceeded, outward coma is extremely produced, which is difficult to compensate for by any design of the other lenses.

Condition (14) is for correcting spherical aberration and astigmatism. When the upper limit is exceeded, higher order spherical aberrations are produced. When the lower limit is exceeded, astigmatism becomes large.

Condition (15) is to maintain a proper separation between the 4-1st lens group and 4-2nd lens group for correcting both of the on-axis and off-axis aberrations in good balance and for constructing the telecentric optical system in a good form. When the upper limit is exceeded, spherical aberration and other on-axis aberrations become difficult to correct. When the lower limit is exceeded, the off-axis aberrations such as astigmatism and coma become difficult to correct, and the telecentric optical system also becomes difficult to form.

Condition (16) is for, while suppressing production of aberrations, constructing a telecentric optical system in good form. When the upper limit is exceeded, coma and distortion are extremely produced. When the lower limit is exceeded, it becomes difficult to form the telecentric optical system.

In a specific embodiment 6 of the invention, the 4-1-3rd lens of the 4-1st lens group is otherwise formed to a negative meniscus shape having a strong refractive surface at the front, and the two lens surfaces of the 4-2-1st lens of the 4-2nd lens group to a concave shape, and the following conditions are satisfied to thereby achieve a better correction of aberrations.

$$0.9 < |R_{IV3}/R_{IV5}| < 1.2 \quad (17)$$

(where $R_{IV3} > 0$, $R_{IV5} < 0$)

$$1.5 < R_{IV7}/f_W < 1.7 \quad (18)$$

$$0.8 < R_{IV10}/f_W < 1.0 \quad (19)$$

$$1.3 < |R_{IV12}/R_{IV13}| < 1.7 \quad (20)$$

(where $R_{IV12} < 0$, $R_{IV13} > 0$)

$$1.15 < R_{IV13}/f_W < 1.4 \quad (21)$$

$$0.05 < D_{IV4}/f_W < 0.2 \quad (22)$$

$$0.55 < D_{IV8}/f_W < 0.85 \quad (23)$$

$$0.16 < D_{IV10}/f_W < 0.24 \quad (24)$$

Condition (17) is for adequately correcting spherical aberration. When the upper limit is exceeded, over-correction of spherical aberration results. When the lower limit is exceeded, under-correction results.

Condition (18) is for, without causing production of an unduly large spherical aberration as possible, the light bundles are converged with good effectiveness. When the upper limit is exceeded, the converging effect becomes insufficient, causing the total length of the entire system to be increased. When the lower limit is exceeded, spherical aberration is extremely produced.

Condition (19) is a condition under which, without causing production of as unduly large coma as possible, a compact telecentric optical system can be constructed in good form. When the upper limit is exceeded, the construction of the optical system in the telecentric form results in an increase of the length of the entire system. When the lower limit is exceeded, outward coma is extremely produced, this aberration becoming difficult to correct by the other lenses.

Conditions (20) and (21) are for well correcting the outward coma produced by the 4-2-1st lens and the sagittal halo. When the upper limit of condition (20) is exceeded, the outward coma increases. When the lower limit is exceeded, it becomes difficult to maintain good balance of coma.

When the upper limit of condition (21) is exceeded, the sagittal halo increases. When the lower limit is exceeded, inward coma is objectionably increased.

Condition (22) is for well correcting spherical aberration and astigmatism. When the upper limit is exceeded, higher order spherical aberrations are produced. When the lower limit is exceeded, astigmatism increases.

Condition (23) is to maintain a proper separation between the 4-1st lens group and the 4-2nd lens group for correcting both of the on-axis and off-axis aberrations in good balance, and for constructing a telecentric optical system in good form. When the upper limit is exceeded, the on-axis aberrations such as spherical aberration become difficult to correct. When the lower limit is exceeded, the off-axis aberrations such as coma and astigmatism become difficult to correct, and the telecentric optical system also becomes difficult to form.

Condition (24) is for, while suppressing production of the various aberrations to as small as possible, constructing a telecentric optical system in good form. When the upper limit is exceeded, coma and distortion are extremely produced. When the lower limit is exceeded, the telecentric optical system becomes difficult to form.

By satisfying the above-described conditions, the zoom lens of the objects of the invention can be achieved. But, to further facilitate a more improved achievement of the objects of the invention, it is preferred to satisfy the following condition:

$$3.0 < |R_{IV4}/R_{IV5}| < 4.6 \tag{25}$$

Condition (25) is for, as an image of the stop is refracted from the focal plane and then refracted again from the lens surface $R_{IV4}$ to take its place on the focal plane with the production of a flare spot, while avoiding this, correcting spherical aberration in good balance. When the upper limit is exceeded, under-correction of spherical aberration results. When the lower limit is exceeded, the spherical aberration is objectionably over-corrected.

In specific embodiments 7, 8 and 9 of the invention, it is in the 4-1st lens group that the 4-1-3rd lens is a meniscus-shaped lens of rearward convexity having a negative refractive power, and the 4-1-4th lens is a meniscus-shaped lens of forward convexity having a positive refractive power, and in the 4-2nd lens group that the 4-2-1st lens is a meniscus-shaped lens of negative power convex toward the front, and the 4-2-3rd lens is a meniscus-shaped lens of positive power convex toward the front.

And, letting $N_{IVi}$ denote the refractive index of the glass of the i-th lens counting from front in the 4th lens group, and $f_{IV}$ the focal length of the 4th lens group, the following conditions are set forth to achieve a further improved correction of aberrations:

That is, $$0.57 < f_{IV}\left( \frac{(N_{IV2} - 1)}{R_{IV4}} - \frac{(N_{IV3} - 1)}{R_{IV5}} \right) < 0.63 \tag{26}$$

$$0.75 < \frac{R_{IV7}}{f_{IV}} < 1.00 \tag{27}$$

$$0.95 < f_{IV}\left( \frac{(N_{IV5} - 1)}{R_{IV10}} - \frac{(N_{IV6} - 1)}{R_{IV11}} \right) < 1.25 \tag{28}$$

$$1.6 < \left| \frac{R_{IV12}}{R_{IV13}} \right| < 2.2 \tag{29}$$

(where $R_{IV12} < 0$, $R_{IV13} > 0$)

$$0.73 < \frac{R_{IV13}}{f_{IV}} < 1.1 \tag{30}$$

$$0.15 < \frac{D_{IV8}}{f_{IV}} < 0.27 \tag{31}$$

Each of the above-described conditions is explained below:

Condition (26) is for adequately correcting spherical aberration. When the upper limit is exceeded, over-correction of spherical aberration results. When the lower limit is exceeded, it becomes under-corrected. Condition (27) is for, without causing production of as unduly large spherical aberration as possible, converging light bundles with good effectiveness. When the upper limit is exceeded, the converging effect is weakened, causing an increase in the total length of the lens system. When the lower limit is exceeded, the spherical aberration is objectionably increased. Condition (28) is for, without causing production of as unduly large coma as possible, well correcting spherical aberration and field curvature. When the lower limit is exceeded, under-correction of spherical aberration and field curvature results. When the upper limit is exceeded, very large outward coma is produced which is difficult to correct by any design of the other lenses. Conditions (29) and (30) are for well compensating for the residual outward coma and the sagittal halo caused by the 4-2-1st lens. When these conditions are violated, it will result either that the outward coma and the sagittal halo are no longer sufficiently compensated for, or conversely that inward coma and over-corrected type spherical aberration are largely produced, leading to lower the optical performance. When the upper limit of condition (29) and the lower limit of condition (30) are exceeded, inward coma and over-corrected type spherical aberration are largely produced. When the lower limit of condition (29) and the upper limit of condition (30) are exceeded, the outward coma produced from the 4-2-1st lens and the sagittal halo cannot be compensated for sufficiently well. Condition (31) is to define a proper separation between the so-called front and rear groups in the 4th lens group for correcting aberrations over the entire area of the frame. When the upper limit is exceeded, the on-axis aberrations are under-corrected. When the lower limit is exceeded, the off-axis aberrations are under-corrected.

In specific embodiments 10, 11, 12 and 13 of the invention, the lens elements are similar in construction and arrangement to those in the specific embodiments 1, 2 and 3, but the following conditions are set forth to thereby achieve a further improved correction of aberrations. That is, $$0.9 < |R_{II3}/R_{II5}| < 1.35 \tag{32}$$

$$(\text{where } R_{II3} > 0, R_{II5} < 0)$$

$$1.4 < R_{II7}/f_W < 1.9 \tag{33}$$

$$0.9 < R_{II10}/f_W < 1.3 \tag{34}$$

$$1.1 < |R_{IV12}/R_{IV13}| < 2 \tag{35}$$

$$(\text{where } R_{IV12} < 0, R_{IV13} > 0)$$

$$1.15 < R_{II13}/f_W < 1.45 \tag{36}$$

$$0.14 < D_{II4}/f_W < 0.27 \tag{37}$$

$$0.8 < D_{II8}/f_W < 0.9 \tag{38}$$

$$0.13 < D_{II10}/f_W < 0.5 \tag{39}$$

Each of the above-described conditions is explained below:

Condition (32) is for adequately correcting spherical aberration. When the upper limit is exceeded, over-correction of spherical aberration results. When the lower limit is exceeded, it becomes under-corrected. Condition (33) is for, without causing production of as unduly large spherical aberration as possible, converging light bundles with good effectiveness. When the upper limit is exceeded, the converging effect becomes insufficient, causing a large increase in the length of the lens system. When the lower limit is exceeded, very large spherical aberration is produced. Condition (34) is for, without causing production of as unduly large coma as possible, constructing a compact telecentric optical system in good form. When the upper limit is exceeded, the construction of the optical system in the telecentric form results in an increase of the total length of the lens system. When the lower limit is exceeded, very large outward coma is produced which is difficult to correct by any design of the other lenses. Conditions (35) and (36) are for well compensating for the outward coma and the sagittal halo produced from the 4-2-1st lens. When these conditions are violated, it will result either that the outward coma and the sagittal halo are not compensated for sufficiently well, or conversely that inward coma and over-corrected type spherical aberration are produced, causing a very large loss in the optical performance.

When the upper limit of condition (35) and the lower limit of condition (36) are exceeded, inward coma and overcorrected type spherical aberration are largely produced. When the lower limit of condition (35) and the upper limit of condition (36) are exceeded, the outward coma produced by the 4-2-1st lens and the sagittal halo cannot be compensated for sufficiently well. Condition (37) is for effectively correcting spherical aberration and longitudinal chromatic aberration. When the upper limit is exceeded, spherical aberration and longitudinal chromatic aberration are largely produced.

When the lower limit is exceeded, astigmatism is objectionably increased.

Condition (38) is to maintain a proper separation between the 4-1st lens group and the 4-2nd lens group for correcting both of the on-axis and off-axis aberrations in good balance. When the upper limit is exceeded, correction of the on-axis aberrations such as spherical aberration becomes difficult. When the lower limit is exceeded, correction of the off-axis aberrations such as astigmatism and coma becomes difficult. Condition (39) is for, while suppressing production of aberrations, constructing the telecentric optical system in a good form. When the upper limit is exceeded, coma and distortion are extremely produced. When the lower limit is exceeded, the telecentric optical system becomes difficult to form.

Numerical examples of the invention is next given where Ri is the radius of curvature of the i-th lens surface counting from front, Di is the i-th lens thickness or air separation, and Ni and νi are the refractive index and Abbe number of the glass of the i-th lens element.

The numerical values of the factors in the inequalities of condition for the specific embodiments are also given in Tables 1 through 5.

| Numerical Example 1 | | | |
|---|---|---|---|
| f = 1–5.956 | F-number = 1.45 | Image Angle 2ω = 52° – 9.4° | |
| R1 = 9.041 | D1 = 0.235 | N1 = 1.80518 | ν1 = 25.4 |
| R2 = 4.214 | D2 = 0.883 | N2 = 1.51633 | ν2 = 64.1 |
| R3 = –14.610 | D3 = 0.013 | | |
| R4 = 4.000 | D4 = 0.541 | N3 = 1.60311 | ν3 = 60.7 |
| R5 = 25.089 | D5 = Variable | | |
| R6 = 18.520 | D6 = 0.106 | N4 = 1.77250 | ν4 = 49.6 |
| R7 = 1.623 | D7 = 0.387 | | |
| R8 = –2.015 | D8 = 0.097 | N5 = 1.69680 | ν5 = 55.5 |
| R9 = 2.015 | D9 = 0.284 | N6 = 1.84666 | ν6 = 23.9 |
| R10 = –37.466 | D10 = Variable | | |
| R11 = –2.345 | D11 = 0.097 | N7 = 1.69680 | ν7 = 55.5 |
| R12 = –19.477 | D12 = Variable | | |
| R13 = 12.026 | D13 = 0.417 | N8 = 1.69680 | ν8 = 55.5 |
| R14 = –2.363 | D14 = 0.097 | | |
| R15 = 2.452 | D15 = 0.417 | N9 = 1.56384 | ν9 = 60.7 |
| R16 = –7.619 | D16 = 0.146 | | |
| R17 = –2.626 | D17 = 0.113 | N10 = 1.84666 | ν10 = 23.9 |
| R18 = –19.095 | D18 = 0.013 | | |
| R19 = 1.511 | D19 = 0.532 | N11 = 1.60311 | ν11 = 60.7 |
| R20 = –36.047 | D20 = 0.829 | | |
| R21 = –2.711 | D21 = 0.071 | N12 = 1.83400 | ν12 = 37.2 |
| R22 = 0.949 | D22 = 0.245 | | |
| R23 = 3.310 | D23 = 0.248 | N13 = 1.51633 | ν13 = 64.1 |
| R24 = –2.109 | D24 = 0.013 | | |
| R25 = 1.221 | D25 = 0.470 | N14 = 1.51633 | ν14 = 64.1 |
| R26 = –4.062 | D26 = 0.532 | | |
| R27 = ∞ | D27 = 0.532 | N15 = 1.51633 | ν15 = 64.1 |
| R28 = ∞ | | | |
| b.f. = 0.022 | Total Length = 10.878 | Stop at 0.115 ahead R13. | |
| f | 1.000 | 2.849 | 5.956 |
| D5 | 0.094 | 2.047 | 2.882 |
| D10 | 3.006 | 0.768 | 0.26 |
| D12 | 0.426 | 0.71 | 0.384 |

Exit Pupil at −22.953 as measured from the image plane
Symbol "∞" for R27 and R28 refers to a dummy glass block equivalent to a face plate, low pass filter or infrared cut filter. The same applies to the following.

| Numerical Example 2 | | | |
|---|---|---|---|
| f = 1–5.95 | F-number = 1.45 | Image Angle 2ω = 52° – 9.4° | |
| R1 = 11.064 | D1 = 0.230 | N1 = 1.80518 | ν1 = 25.4 |
| R2 = 4.384 | D2 = 0.888 | N2 = 1.51633 | ν2 = 64.1 |
| R3 = –10.574 | D3 = 0.008 | | |
| R4 = 3.836 | D4 = 0.532 | N3 = 1.62299 | ν3 = 58.2 |

-continued

Numerical Example 2

| | | | |
|---|---|---|---|
| R5 = 16.727 | D5 = Variable | | |
| R6 = 15.333 | D6 = 0.106 | N4 = 1.77250 | ν4 = 49.6 |
| R7 = 1.610 | D7 = 0.390 | | |
| R8 = −2.076 | D8 = 0.097 | N5 = 1.69680 | ν5 = 55.5 |
| R9 = 1.933 | D9 = 0.293 | N6 = 1.84666 | ν6 = 23.9 |
| R10 = −116.818 | D10 = Variable | | |
| R11 = −2.371 | D11 = 0.097 | N7 = 1.69680 | ν7 = 55.5 |
| R12 = −21.393 | D12 = Variable | | |
| R13 = 14.181 | D13 = 0.408 | N8 = 1.69680 | ν8 = 55.5 |
| R14 = −2.342 | D14 = 0.097 | | |
| R15 = 3.211 | D15 = 0.328 | N9 = 1.60311 | ν9 = 60.7 |
| R16 = −11.824 | D16 = 0.170 | | |
| R17 = −2.411 | D17 = 0.113 | N10 = 1.80518 | ν10 = 25.4 |
| R18 = −5.260 | D18 = 0.012 | | |
| R19 = 1.776 | D19 = 0.488 | N11 = 1.60311 | ν11 = 60.7 |
| R20 = −41.262 | D20 = 0.876 | | |
| R21 = −23.017 | D21 = 0.071 | N12 = 1.80518 | ν12 = 25.4 |
| R22 = 0.986 | D22 = 0.484 | | |
| R23 = 10.254 | D23 = 0.177 | N13 = 1.51633 | ν13 = 64.1 |
| R24 = −2.493 | D24 = 0.012 | | |
| R25 = 1.320 | D25 = 0.417 | N14 = 1.51633 | ν14 = 64.1 |
| R26 = −5.847 | D26 = 0.674 | | |
| R27 = ∞ | D27 = 0.532 | N15 = 1.51633 | ν15 = 64.1 |
| R28 = ∞ | | | | b.f. = 0.036    Total Length = 11.06    Stop at 0.115 ahead R13

| f | 1.000 | 2.848 | 5.95 |
|---|---|---|---|
| D5 | 0.112 | 2.066 | 2.9 |
| D10 | 3.008 | 0.771 | 0.263 |
| D12 | 0.391 | 0.674 | 0.348 |

Exit Pupil at 127.359 as measured from the image plane

Numerical Example 3 f = 1–5.955    F-number = 1.45    Image Angle 2ω = 52° – 9.4°

| | | | |
|---|---|---|---|
| R1 = 9.042 | D1 = 0.235 | N1 = 1.80518 | ν1 = 25.4 |
| R2 = 4.214 | D2 = 0.883 | N2 = 1.51633 | ν2 = 64.1 |
| R3 = −14.611 | D3 = 0.013 | | |
| R4 = 4.000 | D4 = 0.541 | N3 = 1.60311 | ν3 = 60.7 |
| R5 = 25.091 | D5 = Variable | | |
| R6 = 18.522 | D6 = 0.106 | N4 = 1.77250 | ν4 = 49.6 |
| R7 = 1.623 | D7 = 0.387 | | |
| R8 = −2.015 | D8 = 0.097 | N5 = 1.69680 | ν5 = 55.5 |
| R9 = 2.015 | D9 = 0.284 | N6 = 1.84666 | ν6 = 23.9 |
| R10 = −37.471 | D10 = Variable | | |
| R11 = −2.345 | D11 = 0.097 | N7 = 1.69680 | ν7 = 55.5 |
| R12 = −19.479 | D12 = Variable | | |
| R13 = 10.951 | D13 = 0.461 | N8 = 1.69680 | ν8 = 55.5 |
| R14 = −2.181 | D14 = 0.097 | | |
| R15 = 2.547 | D15 = 0.355 | N9 = 1.56384 | ν9 = 60.7 |
| R16 = −93.173 | D16 = 0.258 | | |
| R17 = −2.212 | D17 = 0.111 | N10 = 1.84666 | ν10 = 23.9 |
| R18 = −8.289 | D18 = 0.013 | | |
| R19 = 1.803 | D19 = 0.488 | N11 = 1.60311 | ν11 = 60.7 |
| R20 = −12.252 | D20 = 0.882 | | |
| R21 = −5.284 | D21 = 0.071 | N12 = 1.83400 | ν12 = 37.2 |
| R22 = 1.216 | D22 = 0.255 | | |
| R23 = 11.581 | D23 = 0.266 | N13 = 1.51633 | ν13 = 64.1 |
| R24 = −1.688 | D24 = 0.013 | | |
| R25 = 1.387 | D25 = 0.408 | N14 = 1.51633 | ν14 = 64.1 |
| R26 = −8.544 | D26 = 0.799 | | |
| R27 = ∞ | D27 = 0.532 | N15 = 1.51633 | ν15 = 64.1 |
| R28 = ∞ | | | | b.f. = 0.031    Total Length = 11.199    Stop at 0.115 ahead R13

| f | 1.000 | 2.849 | 5.955 |
|---|---|---|---|
| D5 | 0.094 | 2.048 | 2.882 |
| D10 | 3.006 | 0.768 | 0.260 |
| D12 | 0.404 | 0.688 | 0.362 |

Exit Pupil at −31.228 as measured from the image plane

Numerical Example 4

Image Angle f = 1–7.329    F-number = 1:1.6    2ω = 55.6° – 8.2°

| | | | |
|---|---|---|---|
| R1 = 10.825 | D1 = 0.25 | N1 = 1.80518 | ν1 = 25.4 |
| R2 = 4.544 | D2 = 0.94 | N2 = 1.60311 | ν2 = 60.7 |
| R3 = −16.371 | D3 = 0.01 | | |
| R4 = 3.929 | D4 = 0.50 | N3 = 1.62299 | ν3 = 58.2 |
| R5 = 13.856 | D5 = Variable | | |
| R6 = 28.552 | D6 = 0.11 | N4 = 1.83400 | ν4 = 37.2 |
| R7 = 1.559 | D7 = 0.43 | | |
| R8 = −1.830 | D8 = 0.10 | N5 = 1.69680 | ν5 = 55.5 |
| R9 = 2.012 | D9 = 0.31 | N6 = 1.84666 | ν6 = 23.9 |
| R10 = −17.394 | D10 = Variable | | |
| R11 = −2.568 | D11 = 0.10 | N7 = 1.69680 | ν7 = 55.5 |
| R12 = −29.890 | D12 = Variable | | |
| R13 = Stop | D13 = 0.12 | | |
| R14 = 8.365 | D14 = 0.45 | N8 = 1.69680 | ν8 = 55.5 |
| R15 = −2.733 | D15 = 0.11 | | |
| R16 = 4.576 | D16 = 0.37 | N9 = 1.60311 | ν9 = 60.7 |
| R17 = −7.340 | D17 = 0.16 | | |
| R18 = −2.513 | D18 = 0.12 | N10 = 1.84666 | ν10 = 23.9 |
| R19 = −6.504 | D19 = 0.01 | | |
| R20 = 1.808 | D20 = 0.57 | N11 = 1.58913 | ν11 = 61.0 |
| R21 = −38.918 | D21 = 1.01 | | |
| R22 = −3.414 | D22 = 0.10 | N12 = 1.83400 | ν12 = 37.2 |
| R23 = 1.291 | D23 = 0.13 | | |
| R24 = 9.168 | D24 = 0.26 | N13 = 1.49831 | ν13 = 65.0 |
| R25 = −2.033 | D25 = 0.01 | | |
| R26 = 1.490 | D26 = 0.49 | N14 = 1.51633 | ν14 = 64.1 |
| R27 = −4.647 | D27 = 0.48 | | |
| R28 = ∞ | D28 = 0.57 | N15 = 1.51633 | ν15 = 64.1 |
| R29 = ∞ | | | | b.f. = 0.632    Total Length = 12.088

| f | 1.000 | 3.494 | 7.329 |
|---|---|---|---|
| D5 | 0.123 | 2.372 | 3.113 |
| D10 | 3.338 | 0.681 | 0.278 |
| D12 | 0.281 | 0.688 | 0.351 |

Exit Pupil at −9.128 as measured from the image plane

Numerical Example 5 f = 1–7.329    F-number = 1:1.6    Image Angle 2ω 55.6° – 8.2°

| | | | |
|---|---|---|---|
| R1 = 10.798 | D1 = 0.25 | N1 = 1.80518 | ν1 = 25.4 |
| R2 = 4.553 | D2 = 0.94 | N2 = 1.60311 | ν2 = 60.7 |
| R3 = −17.370 | D3 = 0.01 | | |
| R4 = 3.807 | D4 = 0.50 | N3 = 1.62299 | ν3 = 58.2 |
| R5 = 12.848 | D5 = Variable | | |
| R6 = 11.253 | D6 = 0.11 | N4 = 1.83400 | ν4 = 37.2 |
| R7 = 1.435 | D7 = 0.43 | | |
| R8 = −1.704 | D8 = 0.10 | N5 = 1.69680 | ν5 = 55.5 |
| R9 = 2.133 | D9 = 0.31 | N6 = 1.84666 | ν6 = 23.9 |
| R10 = −11.236 | D10 = Variable | | |
| R11 = −2.656 | D11 = 0.10 | N7 = 1.69680 | ν7 = 55.5 |
| R12 = −47.928 | D12 = Variable | | |
| R13 = Stop | D13 = 0.12 | | |
| R14 = 7.725 | D14 = 0.43 | N8 = 1.69680 | ν8 = 55.5 |
| R15 = −2.808 | D15 = 0.11 | | |
| R16 = 4.605 | D16 = 0.38 | N9 = 1.60311 | ν9 = 60.7 |
| R17 = −7.355 | D17 = 0.24 | | |
| R18 = −2.415 | D18 = 0.11 | N10 = 1.84666 | ν10 = 23.9 |
| R19 = −6.245 | D19 = 0.01 | | |
| R20 = 1.875 | D20 = 0.53 | N11 = 1.58913 | ν11 = 61.0 |
| R21 = −28.090 | D21 = 1.07 | | |
| R22 = −4.566 | D22 = 0.10 | N12 = 1.83400 | ν12 = 37.2 |
| R23 = 1.221 | D23 = 0.14 | | |
| R24 = 5.864 | D24 = 0.26 | N13 = 1.49831 | ν13 = 65.0 |
| R25 = −2.392 | D25 = 0.01 | | |
| R26 = 1.407 | D26 = 0.43 | N14 = 1.51633 | ν14 = 64.1 |
| R27 = −4.975 | D27 = 0.48 | | |
| R28 = ∞ | D28 = 0.57 | N15 = 1.51633 | ν15 = 64.1 |
| R29 = ∞ | | | | b.f. = 0.642    Total Length = 12.133

| f | 1.000 | 3.494 | 7.329 |
|---|---|---|---|
| D5 | 0.118 | 2.367 | 3.107 |
| D10 | 3.328 | 0.672 | 0.269 |

-continued

Numerical Example 5

| D12 | 0.296 | 0.704 | 0.366 |

Exit Pupil at −10.663 as measured from the image plane

Numerical Example 6 f = 1.0 −3.797   F-number = 1:1.6   Image Angle 2ω = 46° − 13°

| | | | |
|---|---|---|---|
| R1 = 5.115 | D1 = 0.15 | N1 = 1.80518 | ν1 = 25.4 |
| R2 = 2.568 | D2 = 0.61 | N2 = 1.58913 | ν2 = 61.0 |
| R3 = −6.924 | D3 = 0.01 | | |
| R4 = 2.083 | D4 = 0.25 | N3 = 1.58913 | ν3 = 61.0 |
| R5 = 3.418 | D5 = Variable | | |
| R6 = 88.383 | D6 = 0.08 | N4 = 1.77250 | ν4 = 49.6 |
| R7 = 1.405 | D7 = 0.22 | | |
| R8 = −1.621 | D8 = 0.08 | N5 = 1.77250 | ν5 = 49.6 |
| R9 = 1.300 | D9 = 0.23 | N6 = 1.84666 | ν6 = 23.9 |
| R10 = −46.805 | D10 = Variable | | |
| R11 = −2.534 | D11 = 0.08 | N7 = 1.69680 | ν7 = 55.5 |
| R12 = 3687.097 | D12 = Variable | | |
| R13 = Stop | D13 = 0.10 | | |
| R14 = 8.084 | D14 = 0.27 | N8 = 1.69680 | ν8 = 55.5 |
| R15 = −1.935 | D15 = 0.07 | | |
| R16 = 2.173 | D16 = 0.25 | N9 = 1.69680 | ν9 = 55.5 |
| R17 = −7.824 | D17 = 0.10 | | |
| R18 = −2.042 | D18 = 0.09 | N10 = 1.84666 | ν10 = 23.9 |
| R19 = −19.819 | D19 = 0.01 | | |
| R20 = 1.622 | D20 = 0.34 | N11 = 1.60311 | ν11 = 60.7 |
| R21 = −4.974 | D21 = 0.72 | | |
| R22 = −3.555 | D22 = 0.08 | N12 = 1.83400 | ν12 = 37.2 |
| R23 = 0.897 | D23 = 0.20 | | |
| R24 = 5.416 | D24 = 0.22 | N13 = 1.51633 | ν13 = 64.1 |
| R25 = −1.726 | D25 = 0.01 | | |
| R26 = 1.167 | D26 = 0.41 | N14 = 1.51633 | ν14 = 64.1 |
| R27 = −2.565 | D27 = 0.08 | | |
| R28 = ∞ | D28 = 0.47 | N15 = 1.51633 | ν15 = 64.1 |
| R29 = ∞ | | | | b.f. = 0.429   Total Length = 7.549

| f | 1.000 | 2.149 | 3.797 |
|---|---|---|---|
| D5 | 0.130 | 1.095 | 1.590 |
| D10 | 1.627 | 0.470 | 0.165 |
| D12 | 0.213 | 0.086 | 0.216 |

Exit Pupil at −39.445 as measured from the image plane

Numerical Example 7 f = 1.00−5.95   F-number = 1:1.00   Image Angle 2ω = 51.9° − 9.4°

| | | | |
|---|---|---|---|
| R1 = 12.398 | D1 = 0.32 | N1 = 1.80518 | ν1 = 25.4 |
| R2 = 5.779 | D2 = 1.21 | N2 = 1.51633 | ν2 = 64.1 |
| R3 = −20.034 | D3 = 0.02 | | |
| R4 = 5.485 | D4 = 0.74 | N3 = 1.60311 | ν3 = 60.7 |
| R5 = 34.404 | D5 = Variable | | |
| R6 = 25.396 | D6 = 0.15 | N4 = 1.77250 | ν4 = 49.6 |
| R7 = 2.226 | D7 = 0.53 | | |
| R8 = −2.763 | D8 = 0.13 | N5 = 1.69680 | ν5 = 55.5 |
| R9 = 2.763 | D9 = 0.39 | N6 = 1.84666 | ν6 = 23.9 |
| R10 = −51.376 | D10 = Variable | | |
| R11 = −3.216 | D11 = 0.13 | N7 = 1.69680 | ν7 = 55.5 |
| R12 = −26.708 | D12 = Variable | | |
| R13 = Stop | D13 = 0.16 | | |
| R14 = 15.459 | D14 = 0.61 | N8 = 1.69680 | ν8 = 55.5 |
| R15 = −3.250 | D15 = 0.13 | | |
| R16 = 3.866 | D16 = 0.49 | N9 = 1.72000 | ν9 = 50.2 |
| R17 = −39.416 | D17 = 0.33 | | |
| R18 = −3.101 | D18 = 0.17 | N10 = 1.84666 | ν10 = 23.9 |
| R19 = −14.811 | D19 = 0.02 | | |
| R20 = 2.297 | D20 = 0.58 | N11 = 1.69680 | ν11 = 55.5 |
| R21 = 10.911 | D21 = 0.62 | | |
| R22 = 3.241 | D22 = 0.13 | N12 = 1.80518 | ν12 = 25.4 |
| R23 = 1.434 | D23 = 0.27 | | |
| R24 = 4.105 | D24 = 0.43 | N13 = 1.60311 | ν13 = 60.7 |
| R25 = −4.105 | D25 = 0.02 | | |
| R26 = 2.405 | D26 = 0.32 | N14 = 1.60311 | ν14 = 60.7 |
| R27 = 7.672 | D27 = 0.90 | | |
| R28 = ∞ | D28 = 0.67 | N15 = 1.51633 | ν15 = 64.1 |
| R29 = ∞ | | | | b.f. = 0.098   Total Length = 14.246   Stop at R13

| f | 1.000 | 2.849 | 5.953 |
|---|---|---|---|
| D5 | 0.129 | 2.808 | 3.952 |
| D10 | 4.122 | 1.054 | 0.355 |
| D12 | 0.426 | 0.815 | 0.370 |

Numerical Example 8 f = 1.00−5.95   F-number = 1:1.00   Image Angle 2ω = 51.9° − 9.4°

| | | | |
|---|---|---|---|
| R1 = 12.398 | D1 = 0.32 | N1 = 1.80518 | ν1 = 25.4 |
| R2 = 5.779 | D2 = 1.21 | N2 = 1.51633 | ν2 = 64.1 |
| R3 = −20.034 | D3 = 0.02 | | |
| R4 = 5.485 | D4 = 0.74 | N3 = 1.60311 | ν3 = 60.7 |
| R5 = 34.404 | D5 = Variable | | |
| R6 = 25.396 | D6 = 0.15 | N4 = 1.77250 | ν4 = 49.6 |
| R7 = 2.226 | D7 = 0.53 | | |
| R8 = −2.763 | D8 = 0.13 | N5 = 1.69680 | ν5 = 55.5 |
| R9 = 2.763 | D9 = 0.39 | N6 = 1.84666 | ν6 = 23.9 |
| R10 = −51.376 | D10 = Variable | | |
| R11 = −3.216 | D11 = 0.13 | N7 = 1.69680 | ν7 = 55.5 |
| R12 = −26.708 | D12 = Variable | | |
| R13 = Stop | D13 = 0.16 | | |
| R14 = 15.459 | D14 = 0.61 | N8 = 1.69680 | ν8 = 55.5 |
| R15 = −3.250 | D15 = 0.13 | | |
| R16 = 3.705 | D16 = 0.51 | N9 = 1.71300 | ν9 = 53.8 |
| R17 = −31.693 | D17 = 0.31 | | |
| R18 = −3.100 | D18 = 0.17 | N10 = 1.80518 | ν10 = 25.4 |
| R19 = −24.300 | D19 = 0.02 | | |
| R20 = 2.272 | D20 = 0.58 | N11 = 1.69680 | ν11 = 55.5 |
| R21 = 12.203 | D21 = 0.58 | | |
| R22 = 3.329 | D22 = 0.12 | N12 = 1.80518 | ν12 = 25.4 |
| R23 = 1.428 | D23 = 0.32 | | |
| R24 = 6.285 | D24 = 0.43 | N13 = 1.60311 | ν13 = 60.7 |
| R25 = −3.365 | D25 = 0.02 | | |
| R26 = 1.849 | D26 = 0.30 | N14 = 1.51633 | ν14 = 64.1 |
| R27 = 5.576 | D27 = 0.90 | | |
| R28 = ∞ | D28 = 0.67 | N15 = 1.51633 | ν15 = 64.1 |
| R29 = ∞ | | | | b.f. = 0.102   Total Length = 14.245   Stop at R13

| f | 1.000 | 2.849 | 5.953 |
|---|---|---|---|
| D5 | 0.129 | 2.808 | 3.952 |
| D10 | 4.122 | 1.054 | 0.355 |
| D12 | 0.426 | 0.815 | 0.370 |

Numerical Example 9 f = 1.00−5.95   F-number = 1:1.00   Image Angle 2ω = 51.9° − 9.4°

| | | | |
|---|---|---|---|
| R1 = 12.398 | D1 = 0.32 | N1 = 1.80518 | ν1 = 25.4 |
| R2 = 5.779 | D2 = 1.21 | N2 = 1.51633 | ν2 = 64.1 |
| R3 = −20.034 | D3 = 0.02 | | |
| R4 = 5.485 | D4 = 0.74 | N3 = 1.60311 | ν3 = 60.7 |
| R5 = 34.404 | D5 = Variable | | |
| R6 = 25.396 | D6 = 0.15 | N4 = 1.77250 | ν4 = 49.6 |
| R7 = 2.226 | D7 = 0.53 | | |
| R8 = −2.763 | D8 = 0.13 | N5 = 1.69680 | ν5 = 55.5 |
| R9 = 2.763 | D9 = 0.39 | N6 = 1.84666 | ν6 = 23.9 |
| R10 = −51.376 | D10 = Variable | | |
| R11 = −3.216 | D11 = 0.13 | N7 = 1.69680 | ν7 = 55.5 |
| R12 = −26.708 | D12 = Variable | | |
| R13 = Stop | D13 = 0.16 | | |
| R14 = 10.937 | D14 = 0.61 | N8 = 1.69680 | ν8 = 55.5 |
| R15 = −3.502 | D15 = 0.13 | | |
| R16 = 3.624 | D16 = 0.49 | N9 = 1.69680 | ν9 = 55.5 |
| R17 = −76.793 | D17 = 0.31 | | |
| R18 = −3.317 | D18 = 0.15 | N10 = 1.80518 | ν10 = 25.4 |
| R19 = −15.134 | D19 = 0.02 | | |
| R20 = 1.960 | D20 = 0.61 | N11 = 1.69680 | ν11 = 55.5 |
| R21 = 6.157 | D21 = 0.41 | | |
| R22 = 4.039 | D22 = 0.15 | N12 = 1.80518 | ν12 = 25.4 |

Numerical Example 9 -continued

| | | | |
|---|---|---|---|
| R23 = 1.357 | D23 = 0.42 | | |
| R24 = 4.135 | D24 = 0.43 | N13 = 1.60311 | ν13 = 60.7 |
| R25 = −4.670 | D25 = 0.02 | | |
| R26 = 2.195 | D26 = 0.37 | N14 = 1.69680 | ν14 = 55.5 |
| R27 = 7.160 | D27 = 0.86 | | |
| R28 = ∞ | D28 = 0.73 | N15 = 1.51633 | ν15 = 64.1 |
| R29 = ∞ | | | | b.f. = 0.096  Total Length = 14.262  Stop at R13

| f | 1.000 | 2.849 | 5.952 |
|---|---|---|---|
| D5 | 0.129 | 2.808 | 3.952 |
| D10 | 4.122 | 1.054 | 0.355 |
| D12 | 0.426 | 0.815 | 0.370 |

Numerical Example 10 f = 1–5.956    F-number = 1.45    Image Angle 2ω = 52° – 9.4°

| | | | |
|---|---|---|---|
| R1 = 9.041 | D1 = 0.235 | N1 = 1.80518 | ν1 = 25.4 |
| R2 = 4.214 | D2 = 0.883 | N2 = 1.51633 | ν2 = 64.1 |
| R3 = −14.610 | D3 = 0.013 | | |
| R4 = 4.000 | D4 = 0.541 | N3 = 1.60311 | ν3 = 60.7 |
| R5 = 25.089 | D5 = Variable | | |
| R6 = 18.520 | D6 = 0.106 | N4 = 1.77250 | ν4 = 49.6 |
| R7 = 1.623 | D7 = 0.387 | | |
| R8 = −2.015 | D8 = 0.097 | N5 = 1.69680 | ν5 = 55.5 |
| R9 = 2.015 | D9 = 0.284 | N6 = 1.84666 | ν6 = 23.9 |
| R10 = −37.466 | D10 = Variable | | |
| R11 = −2.345 | D11 = 0.097 | N7 = 1.69680 | ν7 = 55.5 |
| R12 = −19.477 | D12 = Variable | | |
| R13 = 12.026 | D13 = 0.417 | N8 = 1.69680 | ν8 = 55.5 |
| R14 = −2.363 | D14 = 0.097 | | |
| R15 = 2.452 | D15 = 0.417 | N9 = 1.56384 | ν9 = 60.7 |
| R16 = −7.619 | D16 = 0.146 | | |
| R17 = −2.626 | D17 = 0.113 | N10 = 1.84666 | ν10 = 23.9 |
| R18 = −19.095 | D18 = 0.013 | | |
| R19 = 1.511 | D19 = 0.532 | N11 = 1.60311 | ν11 = 60.7 |
| R20 = −36.047 | D20 = 0.829 | | |
| R21 = −2.711 | D21 = 0.071 | N12 = 1.83400 | ν12 = 37.2 |
| R22 = 0.949 | D22 = 0.245 | | |
| R23 = 3.310 | D23 = 0.248 | N13 = 1.51633 | ν13 = 64.1 |
| R24 = −2.109 | D24 = 0.013 | | |
| R25 = 1.221 | D25 = 0.470 | N14 = 1.51633 | ν14 = 64.1 |
| R26 = −4.062 | D26 = 0.532 | | |
| R27 = ∞ | D27 = 0.532 | N15 = 1.51633 | ν15 = 64.1 |
| R28 = ∞ | | | | b.f. = 0.022  Total Length = 10.878  Stop at 0.115 ahead R13

| f | 1.000 | 2.849 | 5.956 |
|---|---|---|---|
| D5 | 0.094 | 2.047 | 2.882 |
| D10 | 3.006 | 0.768 | 0.26 |
| D12 | 0.426 | 0.71 | 0.384 |

Exit Pupil at −22.953 as measured from the image plane

Numerical Example 11 f = 1–5.95    F-number = 1.45    Image Angle 2ω = 52° – 9.4°

| | | | |
|---|---|---|---|
| R1 = 11.064 | D1 = 0.230 | N1 = 1.80518 | ν1 = 25.4 |
| R2 = 4.384 | D2 = 0.888 | N2 = 1.51633 | ν2 = 64.1 |
| R3 = −10.574 | D3 = 0.008 | | |
| R4 = 3.836 | D4 = 0.532 | N3 = 1.62299 | ν3 = 58.2 |
| R5 = 16.727 | D5 = Variable | | |
| R6 = 15.333 | D6 = 0.106 | N4 = 1.77250 | ν4 = 49.6 |
| R7 = 1.610 | D7 = 0.390 | | |
| R8 = −2.076 | D8 = 0.097 | N5 = 1.69680 | ν5 = 55.5 |
| R9 = 1.933 | D9 = 0.293 | N6 = 1.84666 | ν6 = 23.9 |
| R10 = −116.818 | D10 = Variable | | |
| R11 = −2.371 | D11 = 0.097 | N7 = 1.69680 | ν7 = 55.5 |
| R12 = −21.393 | D12 = Variable | | |
| R13 = 14.181 | D13 = 0.408 | N8 = 1.69680 | ν8 = 55.5 |
| R14 = −2.342 | D14 = 0.097 | | |
| R15 = 3.211 | D15 = 0.328 | N9 = 1.60311 | ν9 = 60.7 |
| R16 = −11.824 | D16 = 0.170 | | |
| R17 = −2.411 | D17 = 0.113 | N10 = 1.80518 | ν10 = 25.4 |

Numerical Example 11 -continued

| | | | |
|---|---|---|---|
| R18 = −5.260 | D18 = 0.012 | | |
| R19 = 1.776 | D19 = 0.488 | N11 = 1.60311 | ν11 = 60.7 |
| R20 = −41.262 | D20 = 0.876 | | |
| R21 = −23.017 | D20 = 0.071 | N12 = 1.80518 | ν12 = 25.4 |
| R22 = 0.986 | D22 = 0.484 | | |
| R23 = 10.254 | D23 = 0.177 | N13 = 1.51633 | ν13 = 64.1 |
| R24 = −2.493 | D24 = 0.012 | | |
| R25 = 1.320 | D25 = 0.417 | N14 = 1.51633 | ν14 = 64.1 |
| R26 = −5.847 | D26 = 0.674 | | |
| R27 = ∞ | D27 = 0.532 | N15 = 1.51633 | ν15 = 64.1 |
| R28 = ∞ | | | | b.f. = 0.036  Total Length = 11.06  Stop at 0.115 ahead R13.

| f | 1.000 | 2.848 | 5.95 |
|---|---|---|---|
| D5 | 0.112 | 2.066 | 2.9 |
| D10 | 3.008 | 0.771 | 0.263 |
| D12 | 0.391 | 0.674 | 0.348 |

Exit Pupil at 127.359 as measured from the image plane

Numerical Example 12 f = 1–5.955    F-number = 1.45    Image Angle 2ω = 52° – 9.4°

| | | | |
|---|---|---|---|
| R1 = 9.042 | D1 = 0.235 | N1 = 1.80518 | ν1 = 25.4 |
| R2 = 4.214 | D2 = 0.883 | N2 = 1.51633 | ν2 = 64.1 |
| R3 = −14.611 | D3 = 0.013 | | |
| R4 = 4.000 | D4 = 0.541 | N3 = 1.60311 | ν3 = 60.7 |
| R5 = 25.091 | D5 = Variable | | |
| R6 = 18.522 | D6 = 0.106 | N4 = 1.77250 | ν4 = 49.6 |
| R7 = 1.623 | D7 = 0.387 | | |
| R8 = −2.015 | D8 = 0.097 | N5 = 1.69680 | ν5 = 55.5 |
| R9 = 2.015 | D9 = 0.284 | N6 = 1.84666 | ν6 = 23.9 |
| R10 = −37.471 | D10 = Variable | | |
| R11 = −2.345 | D11 = 0.097 | N7 = 1.69680 | ν7 = 55.5 |
| R12 = −19.479 | D12 = Variable | | |
| R13 = 10.951 | D13 = 0.461 | N8 = 1.69680 | ν8 = 55.5 |
| R14 = −2.181 | D14 = 0.097 | | |
| R15 = 2.547 | D15 = 0.355 | N9 = 1.56384 | ν9 = 60.7 |
| R16 = −93.173 | D16 = 0.258 | | |
| R17 = −2.212 | D17 = 0.111 | N10 = 1.84666 | ν10 = 23.9 |
| R18 = −8.289 | D18 = 0.013 | | |
| R19 = 1.803 | D19 = 0.488 | N11 = 1.60311 | ν11 = 60.7 |
| R20 = −12.252 | D20 = 0.882 | | |
| R21 = −5.284 | D21 = 0.071 | N12 = 1.83400 | ν12 = 37.2 |
| R22 = 1.216 | D22 = 0.255 | | |
| R23 = 11.581 | D23 = 0.266 | N13 = 1.51633 | ν13 = 64.1 |
| R24 = −1.688 | D24 = 0.013 | | |
| R25 = 1.387 | D25 = 0.408 | N14 = 1.51633 | ν14 = 64.1 |
| R26 = −8.544 | D26 = 0.799 | | |
| R27 = ∞ | D27 = 0.532 | N15 = 1.51633 | ν15 = 64.1 |
| R28 = ∞ | | | | b.f. = 0.031  Total Length = 11.199  Stop at 0.115 ahead R13

| f | 1.000 | 2.849 | 5.955 |
|---|---|---|---|
| D5 | 0.094 | 2.048 | 2.882 |
| D10 | 3.006 | 0.768 | 0.260 |
| D12 | 0.404 | 0.688 | 0.362 |

Exit Pupil at −31.228 as measured from the image plane

Numerical Example 13 f = 1–5.955    F-number = 1.45    Image Angle 2ω = 51.9° – 9.3°

| | | | |
|---|---|---|---|
| R1 = 8.882 | D1 = 0.235 | N1 = 1.80518 | ν1 = 25.4 |
| R2 = 4.265 | D2 = 0.881 | N2 = 1.51633 | ν2 = 64.1 |
| R3 = −14.528 | D3 = 0.021 | | |
| R4 = 3.995 | D4 = 0.540 | N3 = 1.60311 | ν3 = 60.7 |
| R5 = 23.002 | D5 = Variable | | |
| R6 = 13.164 | D6 = 0.106 | N4 = 1.77250 | ν4 = 49.6 |
| R7 = 1.731 | D7 = 0.389 | | |
| R8 = −2.134 | D8 = 0.097 | N5 = 1.69680 | ν5 = 55.5 |
| R9 = 1.901 | D9 = 0.283 | N6 = 1.84666 | ν6 = 23.9 |
| R10 = 20.751 | D10 = Variable | | |
| R11 = −2.459 | D11 = 0.097 | N7 = 1.69680 | ν7 = 55.5 |
| R12 = −32.577 | D12 = Variable | | |

-continued

Numerical Example 13

| | | | |
|---|---|---|---|
| R13 = 8.256 | D13 = 0.487 | N8 = 1.63854 | ν8 = 55.4 |
| R14 = −2.246 | D14 = 0.097 | | |
| R15 = 3.351 | D15 = 0.398 | N9 = 1.60311 | ν9 = 60.7 |
| R16 = −9.263 | D16 = 0.180 | | |
| R17 = −2.525 | D17 = 0.124 | N10 = 1.84666 | ν10 = 23.9 |
| R18 = −8.939 | D18 = 0.013 | | |
| R19 = 1.710 | D19 = 0.531 | N11 = 1.60311 | ν11 = 60.7 |
| R20 = 62.960 | D20 = 0.892 | | |
| R21 = −13.343 | D21 = 0.080 | N12 = 1.83400 | ν12 = 37.2 |
| R22 = 1.093 | D22 = 0.164 | | |
| R23 = 7.299 | D23 = 0.221 | N13 = 1.51633 | ν13 = 64.1 |
| R24 = −2.476 | D24 = 0.013 | | |
| R25 = 1.279 | D25 = 0.389 | N14 = 1.51633 | ν14 = 64.1 |
| R26 = −7.689 | D26 = 0.796 | | |
| R27 = ∞ | D27 = 0.737 | N15 = 1.51633 | ν15 = 64.1 |
| R28 = ∞ | | | | b.f. = 0.015   Total Length = 11.406   Stop at 0.115 ahead R13.

| f | 1.000 | 2.849 | 5.955 |
|---|---|---|---|
| D5 | 0.039 | 1.986 | 2.817 |
| D10 | 3.044 | 0.814 | 0.308 |
| D12 | 0.536 | 0.819 | 0.494 |

Exit Pupil at −9.454 as measured from the image plane.

TABLE 1

Relationship between the conditions and the numerical examples of the invention

| Condition | Factor | Numerical Example 1 | 2 | 3 |
|---|---|---|---|---|
| (1) | $|R_{II3}/R_{IV5}|$ | 0.934 | 1.332 | 1.152 |
| (2) | $R_{II7}/f_W$ | 1.511 | 1.776 | 1.803 |
| (3) | $R_{IV10}/f_W$ | 0.949 | 0.986 | 1.217 |
| (4) | $|R_{IV12}/R_{IV13}|$ | 1.73 | 1.89 | 1.22 |
| (5) | $R_{IV13}/f_W$ | 1.22 | 1.32 | 1.39 |
| (6) | $D_{IV4}/f_W$ | 0.146 | 0.170 | 0.258 |
| (7) | $D_{IV8}/f_W$ | 0.829 | 0.876 | 0.882 |
| (8) | $D_{IV10}/f_W$ | 0.245 | 0.484 | 0.255 |

TABLE 2

Relationship between the conditions and the Numerical examples of the invention

| Condition | Factor | Numerical Example 4 | 5 |
|---|---|---|---|
| (9) | $|f_T/f_{II}|$ | 5.892 | 5.892 |
| (10) | $R_{II2}/f_T$ | 0.213 | 0.195 |
| (11) | $|R_{II3}/R_{IV5}|$ | 1.821 | 1.906 |
| (12) | $R_{II7}/f_W$ | 1.808 | 1.875 |
| (13) | $R_{IV10}/f_W$ | 1.291 | 1.221 |
| (14) | $D_{IV4}/f_W$ | 0.16 | 0.238 |
| (15) | $D_{IV8}/f_W$ | 1.011 | 1.074 |
| (16) | $D_{IV10}/f_W$ | 0.127 | 0.143 |

TABLE 3

Relationship between the conditions and the Numerical example of the invention

| Condition | Factor | Numerical Example 6 |
|---|---|---|
| (17) | $|R_{IV3}/R_{IV5}|$ | 1.064 |
| (18) | $R_{II7}/f_W$ | 1.622 |
| (19) | $R_{IV10}/f_W$ | 0.897 |
| (20) | $|R_{IV12}/R_{IV13}|$ | 1.479 |
| (21) | $R_{IV13}/f_W$ | 1.167 |
| (22) | $D_{IV4}/f_W$ | 0.10 |
| (23) | $D_{IV8}/f_W$ | 0.72 |
| (24) | $D_{IV10}/f_W$ | 0.20 |
| (25) | $R_{IV4}/R_{IV5}$ | 3.832 |

TABLE 4

Relationship between the conditions and the numerical examples of the invention

| Condition | Factor | Numerical Example 7 | 8 | 9 |
|---|---|---|---|---|
| (26) | $f_{IV}\left\{\dfrac{(N_{IV2}-1)}{R_{IV4}} - \dfrac{(N_{IV3}-1)}{R_{IV5}}\right\}$ | 0.618 | 0.585 | 0.580 |
| (27) | $R_{II7}/f_{IV}$ | 0.949 | 0.920 | 0.791 |
| (28) | $F_{II}\left\{\dfrac{(N_{II5}-1)}{R_{II10}} - \dfrac{(N_{II6}-1)}{R_{II11}}\right\}$ | 1.005 | 1.156 | 1.107 |
| (29) | $|R_{II12}/R_{II13}|$ | 1.707 | 1.820 | 2.128 |
| (30) | $R_{II13}/f_{IV}$ | 0.993 | 0.749 | 0.886 |
| (31) | $D_{IV8}/f_{IV}$ | 0.256 | 0.235 | 0.165 |

TABLE 5

Relationship between the conditions and the numerical examples of the invention

| Condition | Factor | Numerical Example 10 | 11 | 12 | 13 |
|---|---|---|---|---|---|
| (32) | $|R_{II3}/R_{IV5}|$ | 0.934 | 1.332 | 1.152 | 1.327 |
| (33) | $R_{II7}/f_W$ | 1.511 | 1.776 | 1.803 | 1.710 |
| (34) | $R_{II10}/f_W$ | 0.949 | 0.986 | 1.217 | 1.093 |
| (35) | $|R_{IV12}/R_{IV13}|$ | 1.73 | 1.89 | 1.22 | 1.936 |
| (36) | $R_{IV13}/f_W$ | 1.22 | 1.32 | 1.39 | 1.279 |
| (37) | $D_{IV4}/f_W$ | 0.146 | 0.170 | 0.258 | 0.180 |
| (38) | $D_{IV8}/f_W$ | 0.829 | 0.876 | 0.882 | 0.892 |
| (39) | $D_{IV10}/f_W$ | 0.245 | 0.484 | 0.255 | 0.164 |

What we claim:

1. A zoom lens comprising:
   four lens groups,
   said four lens groups being, from front to rear,
   a 1st lens group having a positive refractive power and movable for focusing,
   a 2nd lens group having a negative refractive power and movable for changing the image magnification,
   a 3rd lens group having a negative refractive power and movable for compensating for the shift of an image plane resulting from the change of the image magnification, and
   a 4th lens group having two lens groups, or, from front to rear, a 4-1st lens group and a 4-2nd lens group, and having a positive refractive power as a whole,
   said 4-1st lens group consisting of, from front to rear,
   a bi-convex 4-1-1st lens having a strong refractive power at the rear,
   a bi-convex 4-1-2nd lens having a strong refractive power at the front,
   a 4-1-3rd lens of negative refractive power turning its concave surface toward the front, and
   a 4-1-4th lens of positive refractive power turning its convex surface toward the front, and
   said 4-2nd lens group consisting of, from front to rear,
   a 4-2-1st lens of negative refractive power turning its concave surface toward the rear,
   a bi-convex 4-2-2nd lens having a strong refractive power at the rear, and
   a 4-2-3rd lens of positive refractive power having a strong refractive power at the front and turning its convex surface toward the front,
   the axial separation between said 4-1-3rd lens and said 4-1-4th lens and the axial separation between said 4-2-1st lens and said 4-2-2nd lens being smaller than the axial separation between said 4-1-4th lens and said 4-2-1st lens, and said 4-1-2nd lens and said 4-1-3rd lens being axially separated from each other.

2. A zoom lens comprising:
four lens groups,
said four lens groups being, from front to rear,
a 1st lens group having a positive refractive power and movable for focusing,
a 2nd lens group having a negative refractive power and movable for changing the image magnification,
a 3rd lens group having a negative refractive power and movable for compensating for the shift of an image plane resulting from the change of the image magnification, and
a 4th lens group having two lens groups, or, from front to rear, a 4-1st lens group and a 4-2nd lens group, and having a positive refractive power as a whole,
said 4-1st lens group having, from front to rear,
a bi-convex 4-1-1st lens having a strong refractive power at the rear,
a bi-convex 4-1-2nd lens having a strong refractive power at the front,
a 4-1-3rd lens of negative refractive power turning its concave surface toward the front, and
a 4-1-4th lens of positive refractive power turning its convex surface toward the front, and
said 4-2nd lens group having, from front to rear,
a 4-2-1st lens of negative refractive power turning its concave surface toward the rear,
a bi-convex 4-2-2nd lens having a strong refractive power at the rear, and
a 4-2-3rd lens of positive refractive power having a strong refractive power at the front and turning its convex surface toward the front, satisfying the following conditions:

$$0.9 < |R_{IV3}/R_{IV5}| < 1.35$$

(where $R_{IV3} > 0$, $R_{IV5} < 0$)

$$1.4 < R_{IV7}/f_W < 1.9$$

$$0.9 < R1_{IV10}/f_W < 1.3$$

$$1.1 < |R_{IV12}/R_{IV13}| < 2$$

(where $R_{IV12} < 0$, $R_{IV13} > 0$)

$$1.15 < R_{IV13}/f_W < 1.45$$

$$0.14 < D_{IV4}/f_W < 0.27$$

$$0.8 < D_{IV8}/f_W < 0.9$$

$$0.23 < D_{IV10}/f_W < 0.5$$

wherein $R_{IVi}$ is the radius of curvature of the i-th lens surface counting from front in said 4th lens group, $D_{IVi}$ is the i-th axial lens thickness or air separation, and $f_W$ is the shortest focal length of the entire system of said zoom lens.

3. A zoom lens comprising:
four lens groups,
said four lens groups being, from front to rear,
a 1st lens group having a positive refractive power and movable for focusing,
a 2nd lens group having a negative refractive power and movable for changing the image magnification,
a 3rd lens group having a negative refractive power and movable for compensating for the shift of an image plane resulting from the change of the image magnification, and
a 4th lens group having two lens groups, or, from front to rear, a 4-1st lens group and a 4-2nd lens group, and having a positive refractive power as a whole,
said 4-1st lens group having, from front to rear,
a bi-convex 4-1-1st lens having a strong refractive power at the rear,
a bi-convex 4-1-2nd lens having a strong refractive power at the front,
a 4-1-3rd lens of negative refractive power turning its concave surface toward the front, and
a 4-1-4th lens of positive refractive power turning its convex surface toward the front, and
said 4-2nd lens group having, from front to rear,
a 4-2-1st lens of negative refractive power turning its concave surface toward the rear,
a bi-convex 4-2-2nd lens having a strong refractive power at the rear, and
a 4-2-3rd lens of positive refractive power having a strong refractive power at the front and turning its convex surface toward the front, satisfying the following conditions:

$$5.7 < |f_T/f_{II}| < 6.1$$

$$0.18 < R_{II2}/f_T < 0.22$$

$$1.75 < |R_{IV3}/R_{IV5}| < 1.95$$

(where $R_{IV3} > 0$, $R_{IV5} < 0$)

$$1.7 < R_{IV7}/f_W < 1.9$$

$$1.15 < R_{IV10}/f_W < 1.3$$

$$0.15 < D_{IV4}/f_W < 0.25$$

$$0.95 < D_{IV8}/f_W < 1.15$$

$$0.12 < D_{IV10}/f_W < 0.15$$

wherein $R_{IIi}$ is the radius of curvature of the i-th lens surface counting from front in said 2nd lens group, $D_{IIi}$ is the i-th axial lens thickness or air separation in the 2nd lens group, $f_{II}$ is the focal length of said 2nd lens group, $R_{IVi}$ is the radius of curvature of the i-th lens surface counting from front in said 4th lens group, $D_{IVi}$ is the i-th axial thickness or air separation in said 4th lens group, and $f_W$ and $f_T$ are the shortest and longest focal lengths of the entire system of said zoom lens.

4. A zoom lens comprising:
four lens groups,
said four lens groups being, from front to rear,
a 1st lens group having a positive refractive power and movable for focusing,
a 2nd lens group having a negative refractive power and movable for changing the image magnification,
a 3rd lens group having a negative refractive power and movable for compensating for the shift of an image plane resulting from the change of the image magnification, and
a 4th lens group having two lens groups, or, from front to rear, a 4-1st lens group and a 4-2nd lens group, and having a positive refractive power as a whole, said 4-1st lens group having, from front to rear, a bi-convex 4-1-1st lens having a strong refractive power at the rear, a bi-convex 4-1-2nd lens having a strong refractive power at the front, a 4-1-3rd lens of negative refractive power turning its concave surface toward the front, and a 4-1-4th lens of positive refractive power turning its convex surface toward the front, and said 4-2nd lens group having, from front to rear, a 4-2-1st lens of negative refractive power turning its concave surface toward the rear, a bi-convex 4-2-2nd lens having a strong refractive power at the rear, and a 4-2-3rd lens of positive refractive power having a strong refractive power at the front and turning its convex surface toward the front, satisfying the following conditions:

$$0.9 < |R_{IV3}/R_{IV5}| < 1.2$$

(where $R_{IV3} > 0$, $R_{IV5} < 0$)

$$1.5 < R_{IV7}/f_W < 1.7$$

$$0.8 < R_{IV10}/f_W < 1.0$$

$$1.3 < |R_{IV12}/R_{IV13}| < 1.7$$

(where $R_{IV12} < 0$, $R_{IV13} > 0$)

$$1.15 < R_{IV13}/f_W < 1.4$$

$$0.05 < D_{IV4}/f_W < 0.2$$

$$0.55 < D_{IV8}/f_W < 0.85$$

$$0.16 < D_{IV10}/f_W < 0.24$$

wherein $R_{IVi}$ is the radius of curvature of the i-th lens surface counting from front in said 4th lens group, $D_{IVi}$ is the i-th axial thickness or air separation in said 4th lens groups, and $f_W$ is the shortest focal length of the entire system of said zoom lens.

5. A zoom lens according to claim 4, further satisfying the following condition:

$$3.0 < |R_{IV4}/R_{IV5}| < 4.6.$$

6. A zoom lens comprising:

four lens groups, said four lens groups being, from front to rear, a 1st lens group having a positive refractive power and movable for focusing, a 2nd lens group having a negative refractive power and movable for changing the image magnification, a 3rd lens group having a negative refractive power and movable for compensating for the shift of an image plane resulting from the change of the image magnification, and a 4th lens group having two lens groups, or, from front to rear, a 4-1st lens group and a 4-2nd lens group, and having a positive refractive power as a whole, said 4-1st lens group having, from front to rear, a bi-convex 4-1-1st lens having a strong refractive power at the rear, a bi-convex 4-1-2nd lens having a strong refractive power at the front, a 4-1-3rd lens of negative refractive power turning its concave surface toward the front, and a 4-1-4th lens of positive refractive power turning its convex surface toward the front, and said 4-2nd lens group having, from front to rear, a 4-2-1st lens of negative refractive power turning its concave surface toward the rear, a bi-convex 4-2-2nd lens having a strong refractive power at the rear, and a 4-2-3rd lens of positive refractive power having a strong refractive power at the front and turning its convex surface toward the front, satisfying the following conditions:

$$0.57 < f_{IV}\left[\frac{(N_{IV2} - 1)}{R_{IV4}} - \frac{(N_{IV3} - 1)}{R_{IV5}}\right] < 0.63$$

$$0.75 < \frac{R_{IV7}}{f_{IV}} < 1.00$$

$$0.95 < f_{IV}\left[\frac{(N_{IV5} - 1)}{R_{IV10}} - \frac{(N_{IV6} - 1)}{R_{IV11}}\right] < 1.25$$

$$1.6 < \frac{R_{IV12}}{R_{IV13}} < 2.2$$

(where $R_{IV12} < 0$, $R_{IV13} > 0$)

$$0.73 < \frac{|R_{IV13}|}{f_{IV}} < 1.1$$

$$0.15 < \frac{D_{IV8}}{f_{IV}} < 0.27$$

wherein $R_{IVi}$ is the radius of curvature of the i-th lens surface counting from front in said 4th lens group, $D_{IVi}$ is the i-th axial thickness or air separation, $N_{IVi}$ is the refractive index of the glass of the i-th lens element, and $f_{IV}$ is the focal length of said 4th lens group.

7. A zoom lens comprising:

four lens groups, said four lens groups being, from front to rear, a 1st lens group having a positive refractive power and movable for focusing, a 2nd lens group having a negative refractive power and movable for changing the image magnification, a 3rd lens group having a negative refractive power and movable for compensating for the shift of an image plane resulting from the change of the image magnification, and a 4th lens group having two lens groups, or, from front to rear, a 4-1st lens group and a 4-2nd lens group, and having a positive refractive power as a whole, said 4-1st lens group having, from front to rear, a bi-convex 4-1-1st lens having a strong refractive power at the rear, a bi-convex 4-1-2nd lens having a strong refractive power at the front, a 4-1-3rd lens of negative refractive power turning its concave surface toward the front, and a 4-1-4th lens of positive refractive power turning its convex surface toward the front, and said 4-2nd lens group having, from front to rear, a 4-2-1st lens of negative refractive power turning its concave surface toward the rear, a bi-convex 4-2-2nd lens having a strong refractive power at the rear, and a 4-2-3rd lens of positive refractive power having a strong refractive power at the front and turning its convex surface toward the front, satisfying the following conditions:

$0.9 < |R_{IV3}/R_{IV5}| < 1.35$ (where $R_{IV3} > 0$, $R_{IV5} < 0$)

$1.4 < R_{IV7}/f_W < 1.9$ $0.9 < R_{IV10}/f_W < 1.3$ $1.1 < |R_{IV12}/R_{IV13}| < 2$ (where $R_{IV12} < 0$, $R_{IV13} > 0$)

$1.15 < R_{IV13}/f_W < 1.45$ $0.14 < D_{IV4}/f_W < 0.27$ $0.8 < D_{IV8}/f_W < 0.9$ $0.13 < D_{IV10}/f_W < 0.5$ wherein $R_{IVi}$ is the radius of curvature of the i-th lens surface counting from front in said 4th lens group, $D_{IVi}$ is the i-th axial thickness or air separation in said 4th lens group, and $f_W$ is the shortest focal length of the entire system of said zoom lens.

* * * * *

UNITED STATES PATENT AND TRADEMARK OFFICE
CERTIFICATE OF CORRECTION

PATENT NO. : 4,525,036
DATED : June 25, 1985
INVENTOR(S) : Kazuo Fujibayashi, et al It is certified that error appears in the above-identified patent and that said Letters Patent is hereby corrected as shown below:

In the heading of the Patent it should read:

-- [73] Assignee: Canon Kabushiki Kaisha, Tokyo, Japan --.

In the Claims:

Claim 2, Column 19, line 46, change "$0.9 < RI_{IV10}/f_W < 1.3$" to --$0.9 < \underline{R}_{IV10} < f_W < 1.3$--.

Claim 6, Column 22, line 31, change "$0.73 < \frac{|R_{IV13}|}{f_{IV}} < 1.1$" to --$\underline{0.73} < \frac{|R_{IV13}|}{f_{IV}} < 1.1$--.

Signed and Sealed this

Fifth Day of November 1985

[SEAL]

Attest:

DONALD J. QUIGG

Attesting Officer

Commissioner of Patents and Trademarks